US012597421B1

(12) United States Patent
Kumar et al.

(10) Patent No.: US 12,597,421 B1
(45) Date of Patent: Apr. 7, 2026

(54) EVENT TIMELINE SYSTEM

(71) Applicant: Amazon Technologies, Inc., Seattle, WA (US)

(72) Inventors: Shyam Sunder Kumar, Seattle, WA (US); Vandana Sathpathy, Sunnyvale, CA (US); Aparna Kakarparti, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 194 days.

(21) Appl. No.: 18/509,639

(22) Filed: Nov. 15, 2023

(51) Int. Cl.
| | |
|---|---|
| *G10L 15/183* | (2013.01) |
| *G06F 9/54* | (2006.01) |
| *G10L 15/22* | (2006.01) |
| *G10L 15/30* | (2013.01) |

(52) U.S. Cl.
CPC ............ *G10L 15/183* (2013.01); *G06F 9/547* (2013.01); *G10L 15/22* (2013.01); *G10L 15/30* (2013.01); *G10L 2015/223* (2013.01)

(58) Field of Classification Search
CPC ....... G10L 15/183; G10L 15/22; G10L 15/30; G10L 2015/223; G06F 9/547
See application file for complete search history.

(56) References Cited

U.S. PATENT DOCUMENTS

| | | | | |
|---|---|---|---|---|
| 2024/0256762 | A1* | 8/2024 | Beauchamp | G06F 40/166 |
| 2024/0354436 | A1* | 10/2024 | Mukherjee | G06F 16/3344 |
| 2024/0403634 | A1* | 12/2024 | Hawes | G06N 3/08 |
| 2025/0069617 | A1* | 2/2025 | Carbune | G10L 15/183 |
| 2025/0117605 | A1* | 4/2025 | De Wynter | G06F 40/30 |
| 2025/0117895 | A1* | 4/2025 | Miyai | G06T 5/70 |

* cited by examiner

*Primary Examiner* — Abul K Azad
(74) *Attorney, Agent, or Firm* — K&L Gates LLP

(57) ABSTRACT

Devices and techniques are generally described for an event timeline system. In some examples, first prompt data including a first natural language input may be generated. An LLM may generate a first directive to send a first request to a first interface of a first computer-implemented system using the first prompt data. First result data may be received from the first computer-implemented system in response to the first request. The first result data may include a first time-stamped event associated with a first device. Second prompt data including the first natural language input and a representation of the first result data may be generated. The LLM may generate a first output action responsive to the first natural language input using the second prompt data.

20 Claims, 11 Drawing Sheets

Figure 2:
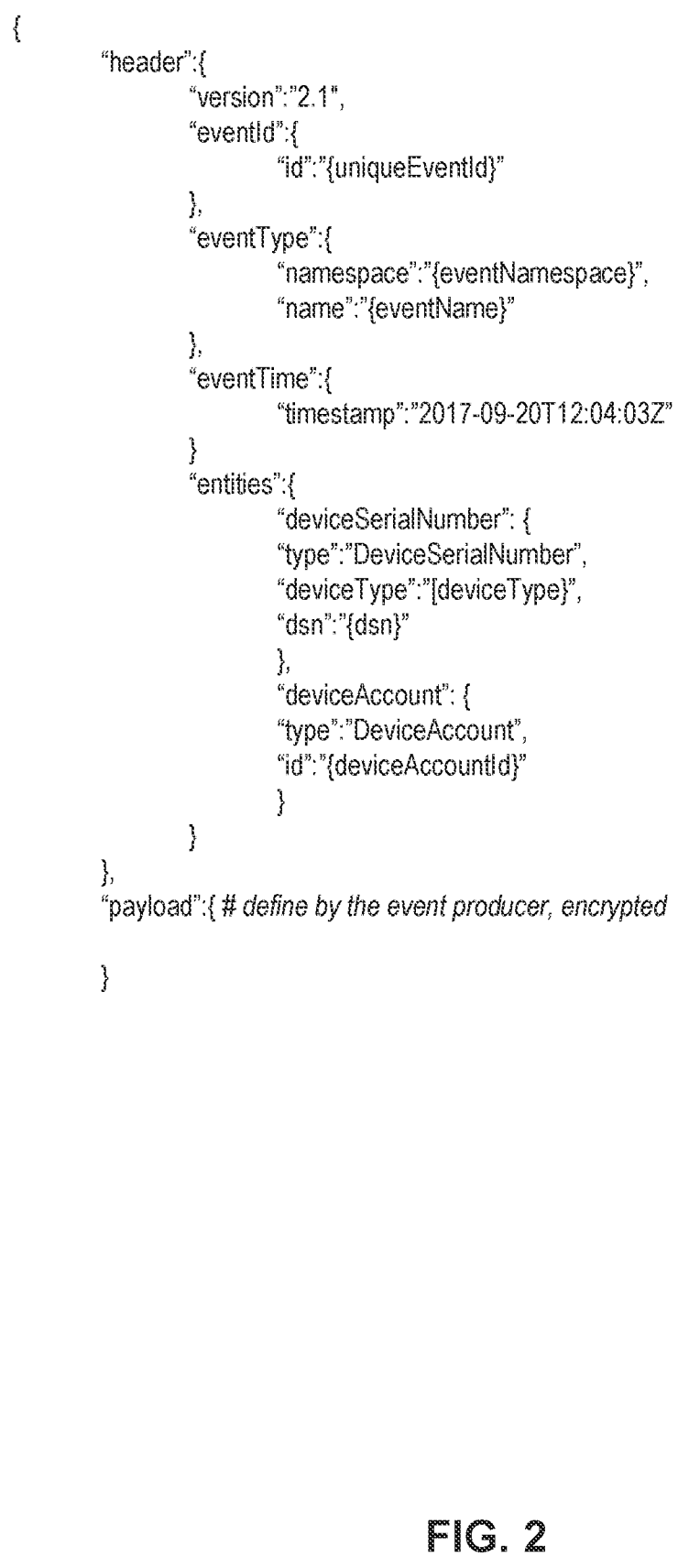

```
{
    "header":{
        "version":"2.1",
        "eventId":{
            "id":"{uniqueEventId}"
        },
        "eventType":{
            "namespace":"{eventNamespace}",
            "name":"{eventName}"
        },
        "eventTime":{
            "timestamp":"2017-09-20T12:04:03Z"
        }
        "entities":{
            "deviceSerialNumber": {
            "type":"DeviceSerialNumber",
            "deviceType":"[deviceType}",
            "dsn":"{dsn}"
            },
            "deviceAccount": {
            "type":"DeviceAccount",
            "id":"{deviceAccountId}"
            }
        }
    },
    "payload":{ # define by the event producer, encrypted

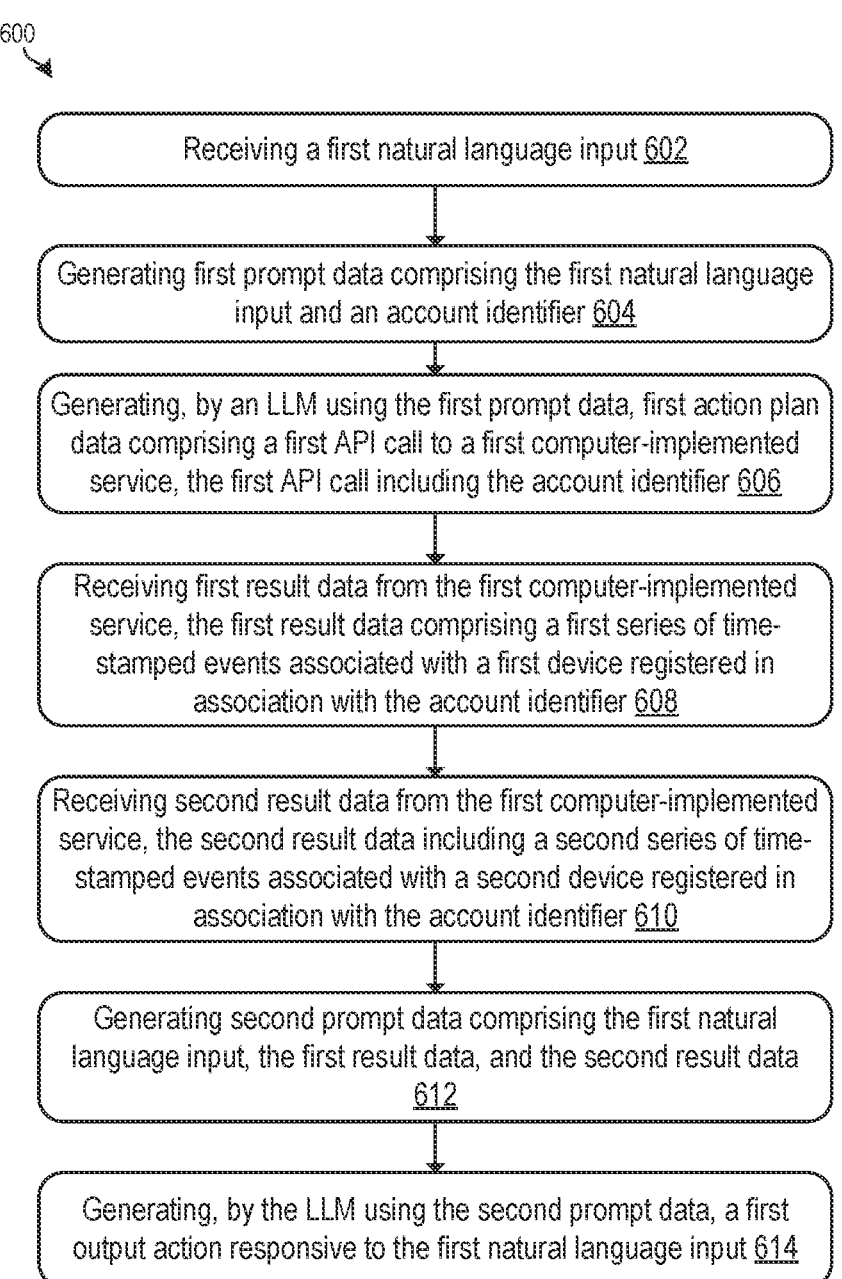

600

Receiving a first natural language input 602

Generating first prompt data comprising the first natural language input and an account identifier 604

Generating, by an LLM using the first prompt data, first action plan data comprising a first API call to a first computer-implemented service, the first API call including the account identifier 606

Receiving first result data from the first computer-implemented service, the first result data comprising a first series of time-stamped events associated with a first device registered in association with the account identifier 608

Receiving second result data from the first computer-implemented service, the second result data including a second series of time-stamped events associated with a second device registered in association with the account identifier 610

Generating second prompt data comprising the first natural language input, the first result data, and the second result data 612

Generating, by the LLM using the second prompt data, a first output action responsive to the first natural language input 614

FIG. 6

EVENT TIMELINE SYSTEM

BACKGROUND

People can interact with computing devices using spoken commands and/or other natural language inputs. In some systems, a "wakeword" is used to activate functionality. Natural language processing is used to transform the natural language requests that follow into a computer directive for performing a task.

BRIEF DESCRIPTION OF DRAWINGS

FIG. 2 depicts example schema data for an event type, according to various embodiments of the present disclosure.

FIG. 6 is a flow chart illustrating an example process for retrieving diverse device data for LLM prompt generation, in accordance with embodiments of the present disclosure.

DETAILED DESCRIPTION

Figure 1A:
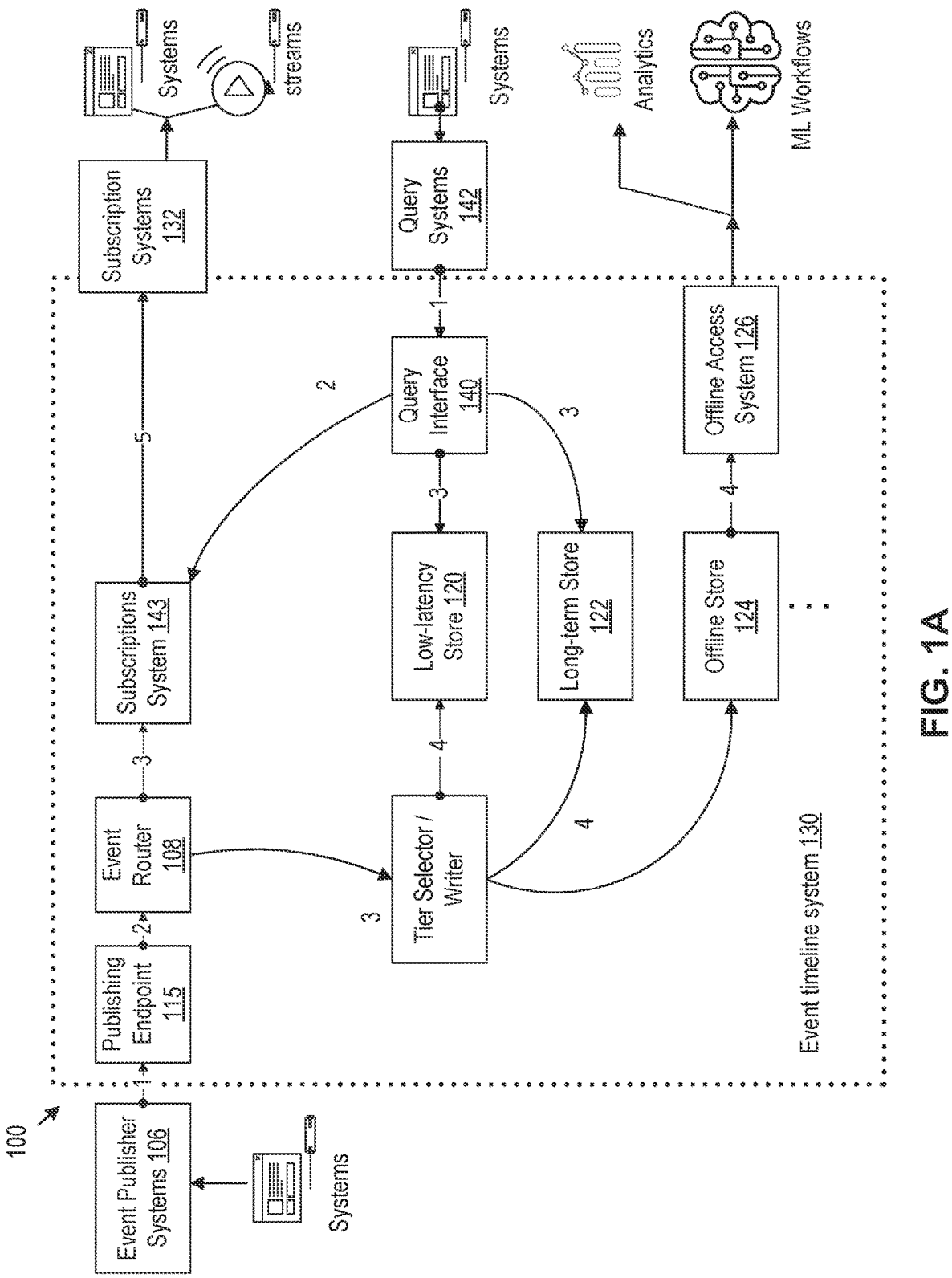
FIG. 1A is an example system diagram illustrating an event timeline system that may be used to receive, process, and provide access to diverse event data, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces (e.g., retail spaces, public transportation), quasi-public spaces (e.g., hotels, offices), and elsewhere generally, and as the technology matures, new services and features are being developed. For instance, a device that includes voice-based personal assistant functionality may be used to control another device including a display so that spoken commands may be used to control content output by the display device. In another example, content may be transferred from one device to another device in response to user requests and/or other triggering events (e.g., If This Then That (IFTTT) recipes, presence information, etc.).

Some natural language processing flows may employ one or more large language models (LLMs) in order to process natural language requests. An LLM is an artificial intelligence (AI) model that may be capable of processing and generating text based on the latent information it has learned from vast amounts of training data. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow the models to understand and generate more natural-sounding text (relative to previous approaches). Examples of LLMs include the generative pre-trained transformer models (e.g., GPT-3, GPT-4), Pathways Language Model (PaLM), Large Language Model Meta Artificial Intelligence (LLaMA), and even non-generative examples such as BERT (bidirectional encoder representations from Transformers), etc.

In a generative context, an LLM may generate text that is responsive to the input prompt provided to the LLM. LLMs excel at generating natural sounding text that appears as though it has been generated by a native speaker in the relevant language. In addition to fluency, generative LLMs are able to generate detailed, relevant, and largely accurate responses to input prompts in many cases due to the large amount of latent information the generative LLM has learned during training.

LLMs are typically trained on relatively large amounts of data that include a wide variety of text from various sources, enabling the LLMs to understand grammar, context, and the relationships between words and sentences. In various examples described herein, a natural language processing flow may employ an LLM to process a natural language request. In some examples, an LLM-based natural language processing flow may generate a prompt from automatic speech recognition (ASR) output data representing a spoken user utterance. The prompt may be fed into the LLM. In other examples, a text input (e.g., text typed on a keyboard) may be used as an input prompt (or may be used to generate an input prompt) to the LLM. The LLM may be trained to output a text-based action plan which may be a formatted into a series of computer-executable actions (including directives to make API requests (sometimes referred to as "API calls", "API requests", or "API directives") to various subsystems) that may be taken in order to perform processing in response to the natural language request. In various examples, an LLM-based processing flow may be a recursive process wherein the initial action plan may be executed (e.g., by making various API calls to API providers to receive results/responses), and the responses (e.g., result data received in response to the API calls) may be used to generate updated LLM prompts which may then be input into the LLM for generation of an updated action plan. In various examples, the prompts used as input during LLM inference may include a text representation of the user request (e.g., a request to answer a question, control a user device, set a calendar reminder, etc.) in addition to other context information that the LLM may use during inference.

For example, a human may be engaged in a dialog with an LLM-based personal assistant and may ask "What is the weather forecast in Seattle today?" The LLM may call an API of a weather service to return the weather forecast to the user. Thereafter, the user may ask "What about tomorrow?" In this example, the LLM may use the previous user request ("What is the weather forecast in Seattle today?" and the previous response ("The weather in Seattle today is sunny with a high of 71 degrees, Fahrenheit") as context when answering the user's follow-up question. For example, text representing the previous question and response may be included in prompt data used during this round of LLM inference such that the LLM may determine that the user is asking about the weather forecast in Seattle for the day after the current day.

However, context data that may be used during LLM inference is not limited to previous turns of dialog between the user and the voice assistant. A large variety of different contextual information may be useful to generate personalized and/or conversational experiences when interacting with an LLM-based voice assistant. For example, previous actions executed by different devices and/or on diverse services (e.g., song playback on a smart speaker, video playback on a display device, home security camera human detection and/or security event detection, light control data, website and/or application interaction data) may be useful in providing context to LLM-based processing to provide improved user experiences. However, there is no guarantee that each different source of contextual information is integrated with the LLM-based voice assistant and/or provides contextual information in any consistent way. Typically, in order to ingest such information, application programming interfaces (APIs) are developed and exposed to ingesting systems. This can require months of API development time and there is no guarantee in consistency between APIs provided by diverse devices and/or services particularly when such devices and/or services are developed and maintained by different entities.

This can lead to disconnected user experiences. For example, a user may request that a particular recipe be displayed by a device including a display. The user may use an inventory management and/or e-commerce application to order groceries. However, such an application may not have access to contextual information related to the recipe, and therefore cannot recommend ingredients to the user. In a related example, a smart refrigerator may use computer vision techniques to determine current user food inventory. If a voice assistant were able to receive food inventory information from the smart refrigerator and also the recipe request information from the display device, the voice assistant may alert the user to potentially missing ingredients and offer to order the missing ingredients for the user. In another example, if context data could be shared among different devices, a voice assistant may determine that a user has left home (based on presence information detected by one or more smart sensors), but that a smart lock has been left unlocked. The voice assistant may prompt the user via a vehicle computer system associated with the user and/or via the user's mobile device to inquire whether the smart lock should be locked. The foregoing examples are merely illustrative and it should be noted that the uses for such contextual information are myriad.

Described herein is, among other things, an event timeline system that unifies access to timestamped event data across any number of devices and/or services provided by machine components. The event timeline system provides consistent interfaces that can be used by any device and/or service either providing data, consuming data, or both. Accordingly, there is no need to develop and/or integrate use-case specific APIs that may be inconsistent across different devices and/or services and which may require on-going maintenance and/or or introduce complex dependencies to other systems.

As described, one example system that may benefit from such a consistent event timeline vending service is an LLM-based processing flow. In at least some examples, an LLM-based processing flow may determine intent data, and may not route intent and/or slot data (e.g., named entities) to a skill or other natural language processing system. Additionally or alternatively, the action plan generated by an LLM-based processing flow may use a series of function calls (including API calls) to take the necessary actions used to respond to the natural language request. As described herein, the LLM-based processing flow may query an API of the event timeline system to retrieve a wide variety of context data that has been provided by a diverse set of devices and/or services to provide highly relevant responses. The LLM may provide the relevant context data retrieved from the event timeline system in the prompt for the next iteration of LLM inference allowing the LLM to consider this information and provide the most contextually-relevant response. For example, a component of an LLM-based processing flow (e.g., a preliminary action plan generation component described in further detail below) may use a query interface of the event timeline system to retrieve event data (e.g., for a given account, device, set of devices, etc.). The event data may be natural language text and/or structured data representing the underlying event. The LLM prompt may include instructions for using the event data and/or exemplars showing example uses of such event data. In some cases the event data may be embedded (e.g., using an encoder) and the LLM prompt may include the embeddings of the event data. The LLM may be fine-tuned to process embedded information and/or the prompt may include instructions for use of the embedded information.

Automatic speech recognition (ASR) is a field of computer science, artificial intelligence, and linguistics concerned with transforming audio data associated with speech into text data and/or other ASR output data representative of that speech. In a voice assistant context, such as those described herein, ASR may be used to transform spoken utterances into text that can then serve as the input to an LLM or other language model (e.g., natural language understanding (NLU), which is a field of computer science, artificial intelligence, and linguistics concerned with enabling computers to derive meaning from text input containing natural language, resulting in specific executable command data (e.g., intent data) or other type of instructions). Text-to-speech (TTS) is a field of computer science, artificial intelligence, and linguistics concerned with enabling computers to output synthesized speech. ASR, generative language models (such as some LLMs), and TTS may be used together as part of a natural language processing system. As used in, natural language input data may comprise audio data (e.g., representing a user request or command), text data, and/or other representation data representing natural language for input into a natural language processing system.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Bard assistant or the Google Assistant system from Google LLC of Mountain View, California, Dragon speech recognition software or the Copilot system from Microsoft Corporation of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LLM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LLMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight di from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by di, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1A is an example LLM-based system 100 illustrating an event timeline system 130 that may be used to receive, process, and provide access to diverse event data, in accordance with various aspects of the present disclosure. The event publisher systems 106 may be any service, device, or system that may generate and send event data to the event timeline system 130. Event data (including individual events) represent point-in-time information related to interaction with a service, device, and/or system. Examples of events may include user-initiated actions (e.g., button presses, clicks, on-screen selections, voice commands to a voice assistant, searches executed using a search engine, registering a device to an account and/or floorplan, etc.). In some further examples, events may include ambient and/or reported events such as motion detection events, sound detection events (e.g., acoustic events such as glass-breaking, dog barking, etc.), visual attention detection, etc. In yet other examples, events may include proactive events such as recipe suggestions provided on a device (e.g., on a home screen or via audio), movie recommendations output on a display device, a smart light being turned on according to a user-defined routine, closing of a smart garage door upon detection that no activity is present within a home, turning off an oven after determining that no user is at home, etc. In still other examples, events may include derived/composite events such as a person detection or device-added events generated by a new Wi-Fi connection to an access point, a computer-vision detection, a geolocation detection, etc. In still further examples, events may include system events such as a media player failing to play a request (e.g., due to a transcoding error), a screen failing to render on a multi-media device, ASR hypothesis data, etc. In some further examples, events may include purchase events, webpage viewing events, e-books read, etc. In general, events may be timestamped such that a time-series of such events from a variety of different systems, devices, and/or services may be received.

An event type represents a type or category of a particular event. For example, a touch event on a home screen of a touchscreen-enabled device, a motion event detected by a smarthome security camera, etc. Event ingestion represents the process of sending events to the event timeline system 130 (such as through a publishing endpoint 115). Event consumption is the process of accessing events from the event timeline system 130. An event owner is an entity that is responsible for registering and/or management of a certain event type in the event timeline system. Event owners are responsible for granting access to an event type, maintaining event type payload schema, etc. An event producer is a service, system, or device ingesting events into the event timeline system 130. An event consumer is a service, system, or device reading events from the event timeline system 130. Examples of event consumers include mobile applications, autonomous robots, LLM-based natural language processing systems, smart televisions, lights, cameras, and other IoT devices, etc. An event schema is the format of event data including the header and payload of the event (e.g., field definitions, per-field data types expected (e.g., int, string, etc.)).

Event publisher systems 106 may register their event types (as described in further detail below) with the event timeline system 130. Thereafter, events generated by the event publisher systems 106 may be published to the event timeline system 130 using a publisher-subscriber asynchronous event messaging service (Step 1). For example, Apache Kafka or a similar synchronous messaging protocol may be used to asynchronously publish event data. Such event messaging architectures are sometimes referred to as event driven architectures (EDAs). In various examples, the event timeline system 130 may also provide a representational state transfer (REST) API through which data may be sent to the event timeline system 130. In any case, the event timeline system 130 may define one or more publishing endpoints 115 for receiving event data. Event router 108 may comprise computer-implemented logic for parsing the headers and/or payload of the received events to determine how to process and/or store such event data (Step 2).

Event router 108 may send some event types to a sub-scriptions system 143 (e.g., a message broker of an EDA) that may determine subscribing systems and send the event data to the relevant subscribers (based on subscribing systems that have subscribed to receive events of the relevant type) (Step 3). Accordingly, the subscriptions system 143 may send the relevant event data to the subscription consumers (e.g., services and/or event stream data) (Step 5). Examples of such consuming systems and/or services are described in further detail below. Subscriber systems (e.g., subscription systems 132) may subscribe to particular topics which may include one or more event types. The particular event types and/or topics (e.g., groups of one or more event types) may be determined by querying a message broker and/or other interface of the particular event-driven architecture used to implement the publisher-subscriber messaging service of the event timeline system 130.

Additionally, event router 108 may determine that some event types are classified for storage in a persistent data store, such as low-latency store 120, long-term store 122, and/or offline access store 124 (Step 3). The tier selector/writer may determine the appropriate tier of storage. Low-latency store 120 may comprise event data that is time sensitive in nature (e.g., context data used by a voice assistant, such as previous dialog turns and/or state data used by an LLM-based voice assistant) and/or which are subject to low-latency service level agreements (SLAs). In various examples, the low-latency store 120 may comprise memory or a cache that is flushed/overwritten on a relatively short time scale (e.g., every hour, day, 48 hours, etc.), in order to provide only the most recent data at low latency. Long-term store 122 may be a data store devoted to storage of longer-term event data (e.g., a week, month, years). Examples may include device registrations, system settings, etc. Offline access store 124 may store bulk data intended for batch access. For example, batches of event data (e.g., downloads of large amounts of event data in a single download) that may be used to retrain machine learning models and/or for analysis (to determine event data trends) may be stored in offline access store 124. Storage of the various event data types by the tier selector/writer may occur at step 4. An offline access system 126 may be an interface for bulk downloads of data from offline store 124. For example, a consumer may query the offline access system 126 data by device ID, account ID, and/or for particular date and/or time ranges. Although, three data stores (low-latency store 120, long-term store 122, and offline store 124) are shown and described in FIG. 1A, any number of data stores with different access latency profiles and/or retention policies may be used in accordance with the desired implementation.

The event timeline system 130 may provide a query interface 140 to enable query systems 142 to retrieve specific data from persistent storage provided by the event timeline system 130. For example, an LLM-based natural language processing service (described in further detail below) may receive a user request to "play my favorite song." In this example, the user's playback history (for a particular music service) may be published to the long-term store 122. Accordingly, the LLM may generate a query for the query interface 140 to retrieve the playback history associated with the account. For example, the query may include the account ID and/or a request to retrieve the top 20 most played songs for the past year. The query interface may retrieve the top-20 most played songs for the past year for the relevant account and may provide this event data in response to the query. Thereafter, the LLM may use this data to either directly generate an output in response to the request (e.g., by playing the most-played song), or may insert this context into the prompt for a subsequent iteration of LLM processing. For example, upon determining the most-played song, the LLM may generate a prompt to determine on which device the user typically plays music generally (or on which device the user plays this specific song) in order to determine an endpoint that is most likely to be associated with the user request.

In various examples, LLM-based processing systems may typically use the query interface 140 to query the low-latency store 120 as speech processing and/or natural language processing tends to be latency sensitive. However, in some examples, an LLM-based processing system may instead subscribe to various event types and store the event timeline data locally to be used as context upon receipt of a natural language request.

In various examples, event publisher systems 106 may generate timestamped event data when there is a change in the state of the device/system/service or its resources (e.g., compute, memory-usage, connectivity). Event publisher systems 106 may opt for appropriate event data transport and delivery to event timeline system 130 based on a variety of factors such as connectivity, latency SLA, accuracy of information, durability requirements, volume of event data, cost, etc. As previously described, the event timeline system 130 may provide a synchronous REST API and an asynchronous EDA API. Clients that need low latency event data access (e.g., ~20 mSec) and acknowledgement may opt for the synchronous option. By contrast, clients that are more latency tolerant (e.g., ~200 mSec) and who do not need acknowledgement may opt for the asynchronous interface. Clients may also change mechanisms as needed.

The event timeline system 130 may provide event processors that may offer opt-in features for event publisher systems 106 and/or clients (e.g., event data consumers). Event processors may be used to modify, decrypt, re-encrypt, in-direct, redact, filter, encode, and/or batch events or their attributes. Once an event is processed by all relevant event processors (determined on a per-event type basis), the processed event can be sent to subscribers and/or made available via the query interface 140.

In at least some examples, the event timeline system 130 may be executed by a local device (e.g., an edge device) such that events ingested by the event timeline system 130 and/or consumed from the event timeline system 130 are only used in a local environment (e.g., on a local area network within a business or a user's home) to preserve privacy and enhance data security. For example, the event timeline system 130 may be executed on a hardware hub that may communicate via a local wireless network with one or more other on-premises devices (e.g., only with devices that are connected to the same local area network). In various examples, such a local instantiation of the event timeline system 130 may mitigate privacy and/or security concerns.

Figure 1B:
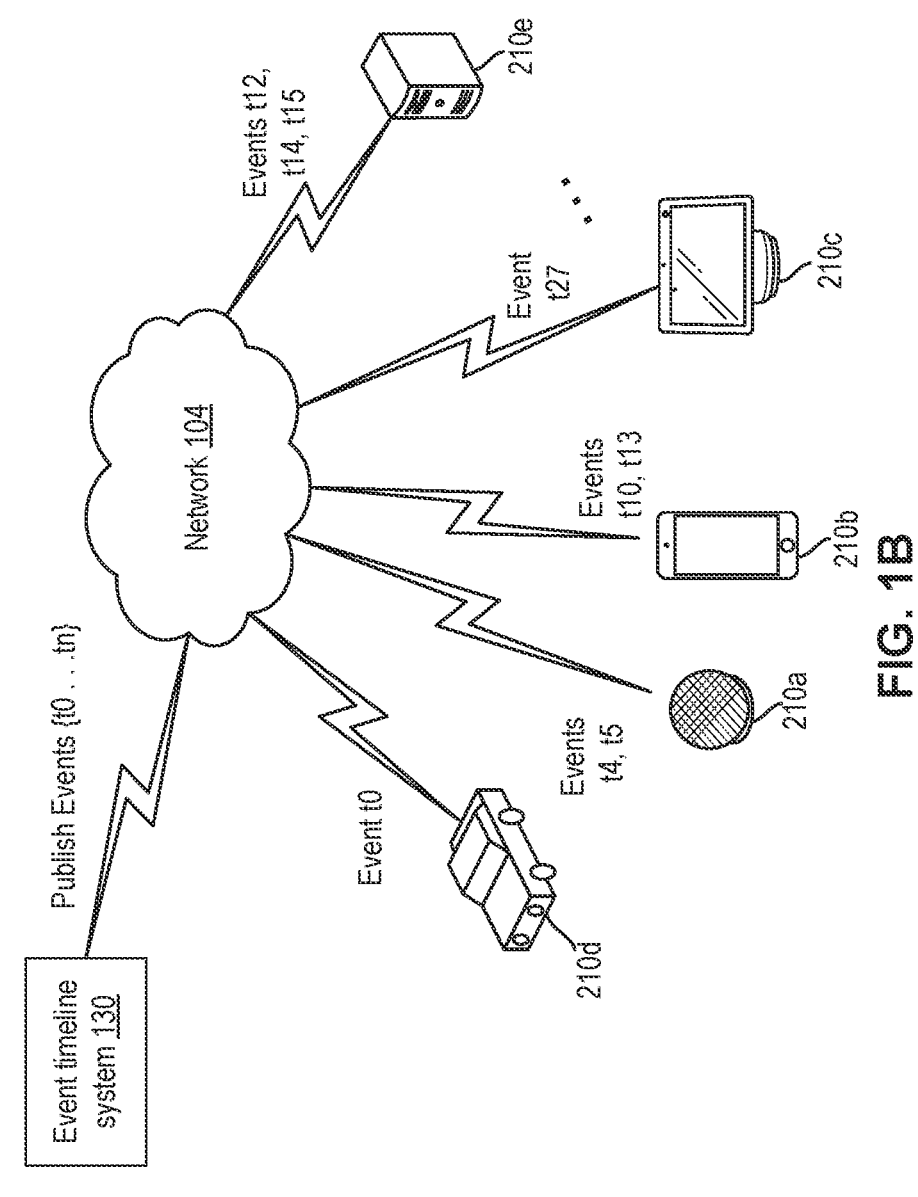
FIG. 1B depicts an example environment where a diverse set of devices and systems publish event data to the event timeline system, in accordance with various aspects of the present disclosure.

FIG. 1B depicts an example environment 200 where a diverse set of devices and services publish event data to the event timeline service, in accordance with various aspects of the present disclosure. In the example depicted in FIG. 1B, a variety of different devices and/or computer-implemented services may communicate with event timeline system 130 over a network 104. Network 104 may be any type of computer communication network. For example, in some embodiments, network 104 may be a wide area network (WAN) such as the Internet. In other examples, network 104 may be a local area network (LAN). In various examples, executing the event timeline system 130 locally on a device communicating on a LAN may allow the event timeline system 130 to maintain custody of potentially sensitive data while still providing event data to various consumer devices/services on the local network, thereby enabling contextually-aware processing. For example, the devices/services 210a, 210b, 210c, 210d, 210e, etc., may be devices connected to a wireless access point within a user's home or within a business. In such an example, the event timeline system 130 may receive and make available event data from the devices/services 210a, 210b, 210c, 210d, 210e without sending the event data over the Internet in order to maintain custody of the event data and/or to avoid divulging private or sensitive information outside the LAN. At the same time, the devices/services 210a, 210b, 210c, 210d, 210e may consume the event data to enable rich, context-aware services and/or experiences. For example, device 210d may be a vehicle (or a computing device of a vehicle). Upon coming within a geofence surrounding the user's home (and/or upon connecting to a common wireless access point with the other devices/services 210a, 210b, 210c, 210e), the device 210d may transmit event data indicating that the vehicle has arrived at the house. In response, the device 210a (e.g., a voice assistant-enabled smart speaker) may consume the event data (e.g., by subscribing to the event type using the event timeline system 130) and may begin playing the user's Welcome Home from Work playlist in response.

In the example of FIG. 1B, the devices/services 210a, 210b, 210c, 210d, 210e may represent various different types of devices and/or services. For example, device 210a may be a voice assistant-enabled smart speaker that may publish event data timestamped t4 and t5. This timestamped event data may represent events of any type published by the device 210a. An example may include a previous received voice request to play a specific song, an event representing detection of a dog barking, baby crying, user snoring, a request to provide the weather forecast, make a dinner reservation, etc.

Device 210b may be a mobile device, such as a smartphone, tablet, etc. In the example of FIG. 1B, the device 210b may publish event data at timestamps t10 and t13. The events may represent events detected by and/or generated by the device 210b (e.g., a phone call being placed, accelerometer data, a low battery warning, a received text message, etc.). The event data may be published to event timeline system 130.

Device 210c may be a display device (e.g., a smart television, a voice assistant device including a display, etc.). In the example of FIG. 1B, the device 210b may publish event data at timestamp t27. The event may represent an event detected by and/or generated by the device 210c (e.g., a video call being initiated, a voice request to play a particular video (such as a movie, a recipe video), a song, a request to display a particular product, etc.). The event data may be published to event timeline system 130.

Device 210e may be a computing device such as a desktop computing device and/or may represent one or more computing devices that provides a computer-implemented service. For example, the device 210e may represent multiple computing devices that implement various components of a natural language processing system (such as the natural language processing system 302 described in reference to FIG. 3A). Device 210e may send event data according to the types of event data associated with this device and/or computer-implemented service to the event timeline system 130. In the example of FIG. 1B, device 210e sends timestamped events t12, t14, and t15 to event timeline system 130.

Although the devices/services 210a, 210b, 210c, 210d, 210e depicts specific types of devices, these depictions are for illustrative purposes only. Any types of devices and/or computer-implemented services may publish and/or consume the timestamped event data. In addition, although the descriptions above primarily describe publishing of event data by the various devices/services (e.g., devices/services 210a, 210b, 210c, 210d, 210e), it should be appreciated that these devices/services may also consume the event data from the event timeline system 130 (e.g., using query interface 140, offline access system 126, and/or a subscription-based EDA).

Figure 1C:
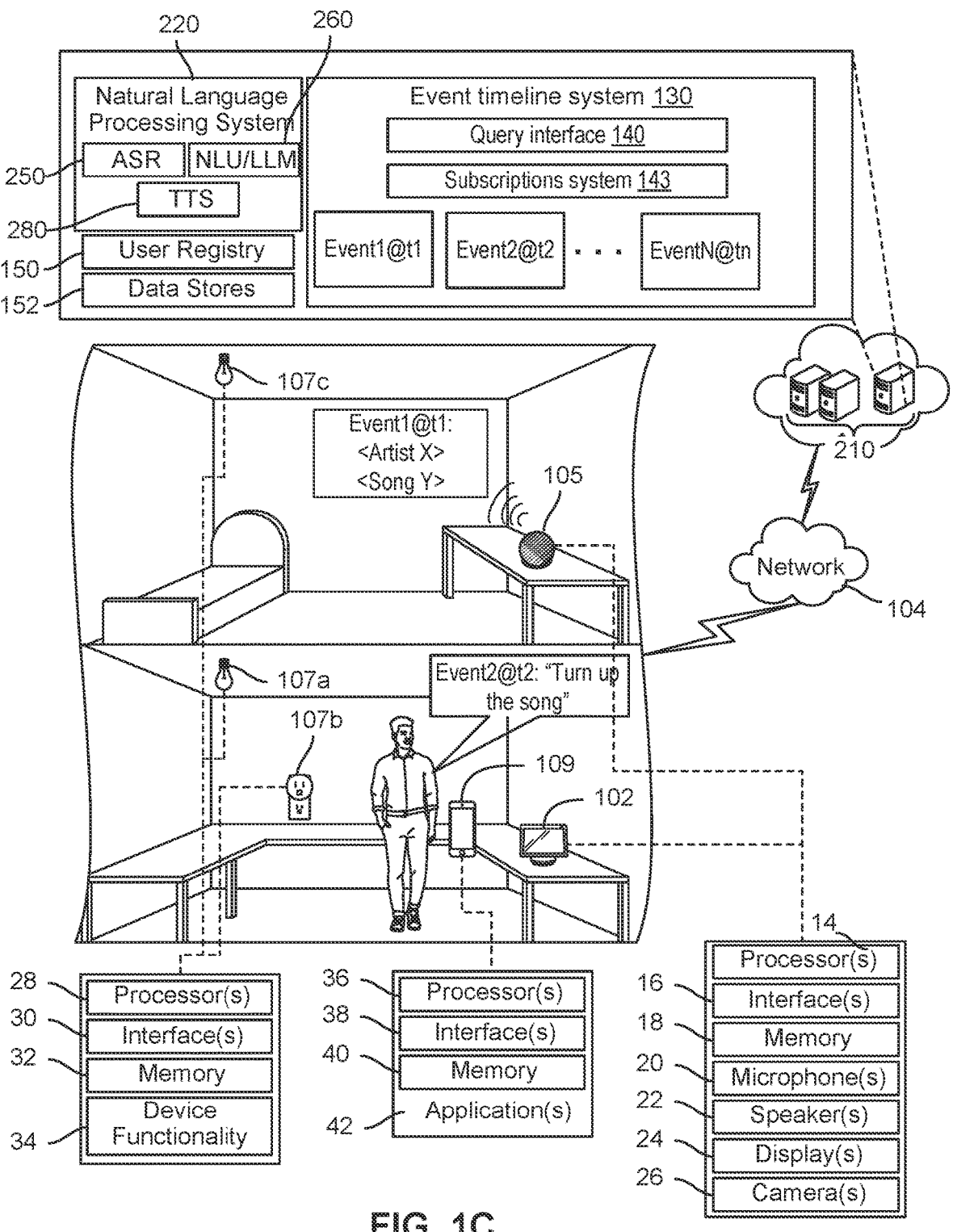
FIG. 1C is a block diagram illustrating another example environment in which another diverse set of devices and systems publish and consume event data using an event timeline system, according to various aspects of the present disclosure.

FIG. 1C is a block diagram illustrating another example environment in which another diverse set of devices and services publish and consume event data using event timeline system 130, according to various aspects of the present disclosure. The environment in FIG. 1C may include, for example, a first voice-enabled device 102 and a second voice-enabled device 105. The first voice-enabled device 105 and/or the second voice-enabled device 105 may be configured to receive user utterances and perform operations in response to such user utterances. In these examples, the first voice-enabled device 102 and/or the second voice-enabled device 105 may be "hands free" such that interactions with the devices are performed through audible requests and responses. The first voice-enabled device 102 may be located or otherwise situated in a first space. The second voice-enabled device 105 may be located or otherwise situated in a second space. As shown by way of example in FIG. 1C, the first voice-enabled device 102 is located in an "office" while the second voice-enabled device 105 is located in a "bedroom." It should be understood that the devices may be located in spaces other than those specifically mentioned in this disclosure. It should also be understood that while the spaces depicted in FIG. 1C are rooms, the spaces may be any space. Additionally, although not shown in FIG. 1C, a vehicle electronic control unit (ECU) (such as device 210*d*) may be configured in communication with the various other devices depicted in FIG. 1C over network 104 or another computer communication network.

The system 100 may also include one or more accessory devices 107*a*-107*c*. The accessory devices 107*a*-*c* may be described as "smart" devices, which may have certain computing components and be configured to send and/or receive data from other devices. The accessory devices 107*a*-*c* may be, for example, light bulbs, plugs, locks, televisions, appliances, doorbells, cameras, etc. As shown in FIG. 1A, the first space in which the first voice-enabled device 102 is situated may include a first accessory device 107*a*, which may be a light bulb, and a second accessory device 107*b*, which may be a plug. The accessory devices 107*a*-*c* may be "paired" or otherwise associated with the first voice-enabled device 102 and/or the second voice-enabled device 105. As such, the accessory devices 107*a*-*c* may be configured to send data to and/or receive data from the voice-enabled devices 102, 105. Likewise, the second space in which the second voice-enabled device 105 is situated may include a third accessory device 107*c*, which may be a light bulb. The third accessory device 107*c* may be paired or otherwise associated with the voice-enabled devices 102, 105. The accessory devices 107*a*-*c* may be associated with naming indicators, which may be provided by a user of the accessory devices 107*a*-*c*, the system 210, and/or one or more third-party systems.

The system 100 may also include a personal device 109, which may include a mobile device such as a mobile phone. The personal device 109 may be associated with the voice-enabled devices 102, 105 and/or the accessory device 107*a*-*c*. In these examples, the personal device 109 may be configured to send data to and/or receive data from the voice-enabled devices 102, 105 and/or the accessory devices 107*a*-*c*.

The first voice-enabled device 102, the second voice-enabled device 105, the accessory devices 107*a*-*c*, and/or the personal device 109 may be configured to send data to and/or receive data from a system 210, such as via a network

104. In examples, one or more of the component of the system 210 may communicate directly with the system 210, via the network 104. In other examples, one or more of the accessory devices 107*a*-*c* may communicate with one or more of the voice-enabled devices 102, 105, and the voice-enabled devices 102, 105 may communicate with the system 210. Additionally, the personal device 109 may communicate directly with the voice-enabled devices 102, 105, the accessory devices 107*a*-*c*, and/or the system 210. In further examples, a hub device, not shown in FIG. 1C, may be utilized by the accessory devices 107*a*-*c* and/or the voice-enabled devices 102, 105 to send data to and/or receive data from other devices.

The voice-enabled devices 102, 105, accessory devices 107*a*-*c*, personal device 109, etc., may publish timestamped event data to the event timeline system 130 (e.g., using the publishing endpoint 115 of FIG. 1A). Such data may be routed by event router 108 and may be sent to subscription systems 132 (which may include one or more of the voice-enabled devices 102, 105, accessory devices 107*a*-*c*, personal device 109) and/or may be stored in low-latency store 120, long-term store 122, offline store 124, etc. for access via query interface 140.

In the example of FIG. 1C, a first timestamped event ("Event1@t1") may be associated with playback by the voice-enabled device 105 of <Song Y> by <Artist X>. In various examples, this timestamped event data may be published to the event timeline system 130. In various examples, one or more other devices may subscribe to events of this type. For example, one or more other smart speakers that are playback-paired with the voice-enabled device 105 may subscribe to song playback events (such as Event1) in order to initiate playback on these devices and/or to adjust equalization settings for music playback. In some further examples, Event1@t1 may be stored in a data store of the event timeline system 130 so that such data is available to an LLM-based natural language processing system. Accordingly, when the user requests "Turn up the song", the LLM-based natural language processing system may retrieve Event1 which may be included in prompt data as contextual information used by the LLM during inference (e.g., to determine what song the user is referring to).

Additionally, the user utterance "Turn up the song" may itself be a timestamped event (e.g., Event2@t2). Accordingly, this event data may be published to the event timeline system 130. The event router 108 may determine (using the event type of event2) to which data stores to store the event data and/or which other devices and/or systems subscribe to events of this type. Accordingly, the event timeline system 130 may receive a time series of event data via a publishing interface of an EDA. The event data may be made available to consuming devices, systems, and/or computer-implemented services, according to the event type (defined during event on-boarding). For example, event data of a first event type may be stored in low-latency store 120 (FIG. 1A) and made available via query interface 140. Event data of a second type may be stored in offline store 124 and may also be published to subscribers (e.g., subscription systems 132). The data stores and/or access APIs (e.g., Asynchronous EDA API vs. query interface 140) for a given event type may be defined during on-boarding of that event type.

The first voice-enabled device 102 and/or the second voice-enabled device 105 may include one or more components, such as, for example, one or more processors 14, one or more network interfaces 16, memory 18, one or more microphones 20, one or more speakers 22, one or more displays 24, and/or one or more cameras 26. The microphones 20 may be configured to capture audio, such as user utterances, and generate corresponding audio data. The speakers 22 may be configured to output audio, such as audio corresponding to audio data received from another device (e.g., from a content streaming service) and/or the system 210. The displays 24 may be configured to present images, such as images corresponding to image data received from another device and/or the system 210. The cameras 26 may be configured to capture images and to generate corresponding image data.

The accessory devices 107*a-c* may include one or more components, such as, for example, one or more processors 128, one or more network interfaces 30, memory 32, and/or device functionality components 34. The memory 32 and/or processors 28 may be utilized to cause certain operations to be performed by the accessory devices 107*a-c*, such as activating and/or deactivating the device functionality components 34. The device functionality components 34 may include components associated with the intended use of the accessory devices 107*a-c*. For example, the first accessory device 107*a* may be a light bulb, and in this example, the device functionality components 34 may include a filament and/or light emitting diode that may produce and/or emit light. By way of further example, the second accessory device 107*b* may be a wall plug, and in this example, the device functionality components 34 may include an "on/off mechanism" for causing electricity to flow or not flow to a device that is plugged in to the wall plug. It should be noted that the device functionality components 34 illustrated here are by way of example only. An on event or an off event may be another example of timestamped event data that may be published to the event timeline system 130.

The personal device 109 may include one or more components such as, for example, one or more processors 36, one or more network interfaces 38, and memory 40. The memory 40 may include one or more components, such as, for example, one or more applications 42. The applications 42 may reside on the memory 40 of the personal device 109 and/or the applications 42 may reside elsewhere, such as with the system 210, and may be accessible via the personal device 109. The applications 42 may be configured to cause the processors 36 to display one or more user interfaces associated with operations of the voice-enabled devices 102, 105 and/or the accessory devices 107*a-c*. The user interfaces may be utilized to receive inputs from the user of the personal device 109 and/or to provide content to the user.

The system 210 may include components such as, for example, a user registry 150, one or more data stores 152, a natural language processing system 220, and/or the event timeline system 130. In various other examples, the event timeline system 130 may be instantiated locally (e.g., on a device within the premises). The natural language processing system 220 may include an automatic speech recognition (ASR) component 250, a natural language understanding (NLU) component 260 (including a named entity recognition component), and/or a text-to-speech (TTS) component 280. In various examples, instead of using NLU 260 an LLM may be employed to understand and/or respond to a natural language input. In various other examples, the natural language processing system 220 may be implemented at least in part by system 210. Each of the components described herein with respect to the system 210 may be associated with their own systems, which collectively may be referred to herein as the system 210, and/or some or all of the components may be associated with a single system. In examples, some or each of the components of the system 210 may include their own processor(s), network interface(s), and/or memory. As such, by way of example, the natural language processing system 220 may include and/or be associated with processor(s), network interface(s), and/or memory. The event timeline system 130 may include and/or be associated with different processor(s), network interface(s), and/or memory, or one or more of these components may utilize some or all of the same processor(s), network interface(s), and/or memory utilized by the natural language processing system 220. Additionally, the operations and/or functionalities associated with and/or described with respect to the components of the system 210 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 150 may be configured to identify, determine, and/or generate associations between users, user accounts, and/or devices. For example, one or more associations between user profiles and user accounts may be identified, determined, and/or generated by the user registry 150. The user registry 150 may additionally store information indicating one or more applications and/or resources accessible to and/or enabled for a given user account. Additionally, the user registry 150 may include information indicating device identifiers, such as naming identifiers, associated with a given user account, as well as device types associated with the device identifiers. The user registry 150 may also include information indicating user account identifiers, naming indicators of devices associated with user accounts, and/or associations between voice-enabled devices 102, 105 and accessory devices 107*a-c*. It should also be understood that the terms "user account" may be used to describe a set of data and/or functionalities associated with a given account identifier. For example, data identified, determined, and/or generated while using some or all of the system 210 may be stored or otherwise associated with an account identifier. Data associated with the user accounts may include, for example, account access information, historical usage data, device-association data, and/or preference data.

The data stores 152 may be configured to identify, determine, and/or generate data associated with use of the voice-enabled devices 102, 105 and/or the accessory devices 107*a-c*. For example, the voice-enabled devices 102, 105 may be utilized to cause the accessory devices 107*a-c* to operate. Usage data may be identified, determined, and/or generated that indicates some or each of these interactions. In various examples, the data stores 152 may include one or more of the low-latency store 120, the long-term store 122, the offline store 124, etc. Device-state data, prior-request data, and/or other usage data may also be identified, determined, and/or generated. It should be understood that while the user registry 150 and the data stores 152 are illustrated as separate components, the user registry 150 and the data stores 152 may be the same component.

The remaining components of the system 210 that are illustrated in FIG. 1C will be described below by way of an example use case. It should be noted that this use case is provided for illustrative purposes, and not by way of limitation.

The speechlet(s) (such as smart-home speechlet 158) described herein may include a speech-enabled web component that may run in the system 210. Speechlet(s) may receive and respond to speech-initiated requests. Speechlet (s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 14, 28, and/or 36, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 14, 28, 36, and/or the processor(s) described with respect to the components of the system 210 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 14, 28, 36, and/or the processor(s) described with respect to the components of the system 210 may possess its own local memory, which also may store program components, program data, and/or one or more operating systems.

The memory 18, 32, 40, and/or the memory described with respect to the components of the system 210 may include volatile and nonvolatile memory, removable and non-removable media implemented in any method or technology for storage of information, such as computer-readable instructions, data structures, program component, or other data. Such memory 18, 32, 40, and/or the memory described with respect to the components of the system 210 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 18, 32, 40, and/or the memory described with respect to the components of the system 210 may be implemented as computer-readable storage media ("CRSM"), which may be any available physical media accessible by the processor(s) 14, 28, 36, and/or the processor(s) described with respect to the components of the system 210 to execute instructions stored on the memory 18, 32, 40, and/or the memory described with respect to the components of the system 210. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The network interface(s) 16, 30, 38, and/or the network interface(s) described with respect to the components of the system 210 may enable messages between the components and/or devices shown in system 210 and/or with one or more other remote systems, as well as other networked devices. Such network interface(s) 16, 30, 38, and/or the network interface(s) described with respect to the components of the system 210 may include one or more network interface controllers (NICs) or other types of transceiver devices to send and receive messages over the network 104.

For instance, each of the network interface(s) 16, 30, 38, and/or the network interface(s) described with respect to the components of the system 210 may include a personal area network (PAN) component to enable messages over one or more short-range wireless message channels. For instance, the PAN component may enable messages compliant with at least one of the following standards IEEE 802.15.4 (Zig-Bee), IEEE 802.15.1 (Bluetooth), IEEE 802.11 (WiFi), or any other PAN message protocol. Furthermore, each of the network interface(s) 16, 30, 38, and/or the network interface(s) described with respect to the components of the system 210 may include a wide area network (WAN) component to enable message over a wide area network.

In some instances, the system 210 may be local to a space associated the first voice-enabled device 102 and/or the second voice-enabled device 105. For instance, the system 210 may be located within the first voice-enabled device 102 and/or the second voice-enabled device 105. In some instances, some or all of the functionality of the system 210 may be performed by the first voice-enabled device 102 and/or the second voice-enabled device 105. Also, while various components of the system 210 have been labeled and named in this disclosure and each component has been described as being configured to cause the processor(s) to perform certain operations, it should be understood that the described operations may be performed by some or all of the components and/or other components not specifically illustrated.

FIG. 2 depicts example schema data for an event type, according to various embodiments of the present disclosure. As shown in FIG. 2 the event data (an event object) is split into Header fields and Payload. Header fields describe the event type and provide tools to filter, index, and/or route the event to the appropriate consumers. Payload comprises the event data and the schema is controlled by the event publisher systems 106 and is provided to event timeline system 130 during registration.

Notable fields in the Header include eventType, entities map used to transmit resources related to the event data, (e.g., identifier data such as a unit identifier data, account identifier data, device identifier data, etc.), and the timestamp for the event data. The Header may be extensible with fields added through a natural language processing system and/or companion application in order to support future use cases.

Although not shown in FIG. 2, in some examples, there may be a sensitive data tag Header field that may be used for compliance and/or in order to maintain proper custody of sensitive data. For example, a sensitive data tag may indicate that a particular event includes child data or health data to ensure that such event data are not transmitted outside of a local network.

Upon registration, an event publisher 106 defines the event type in the payload, provides the schema for the event type, identifies any event processing and/or encryption for the event type, identifies storage and/or latency requirements for the event, and whether the event type will be accessible via synchronous query-based API, asynchronous event-driven API, or both. Event timeline system 130 provides a registration portal for event publisher systems 106 to register their own event types. Event types may be associated with different configuration data defining such information as storage tiers for the event type (e.g., low latency store 120, long-term store 122, offline store 124, etc.). Event timeline system 130 may not permit custom one-off modification for individual event types, but may instead may enable a list of common re-usable features across all event types in order to standardize event type data and make it easier to consume by consumer systems/services. As an example, for event types that are stored in offline-store 124, event timeline system 130 may build this support in a generic fashion as an offline-storage target/destination configuration for an event type, rather than building the off-line store 124 with explicit hard-coding for certain event types. Event timeline system 130 may provide support for multiple configurations ranging from event-type and/or ownership metadata (e.g., in Header), online storage tiers-configuration data (e.g., enabled storage tiers), internal configurations per-event type (such as retention policy, encryption configurations (e.g., Keymaster vs. Key Management Service (KMS) and encryption keys), offline bulk storage configuration data such as destination storage type (e.g., Datamart vs. S3 instances, etc.), offline encryption configuration data (e.g., KMS keys), subscription support configuration data (e.g., limitations on targets, etc.), event payload schema reference (e.g., payload reference to schema stored at remote location), etc.

Figure 3A:
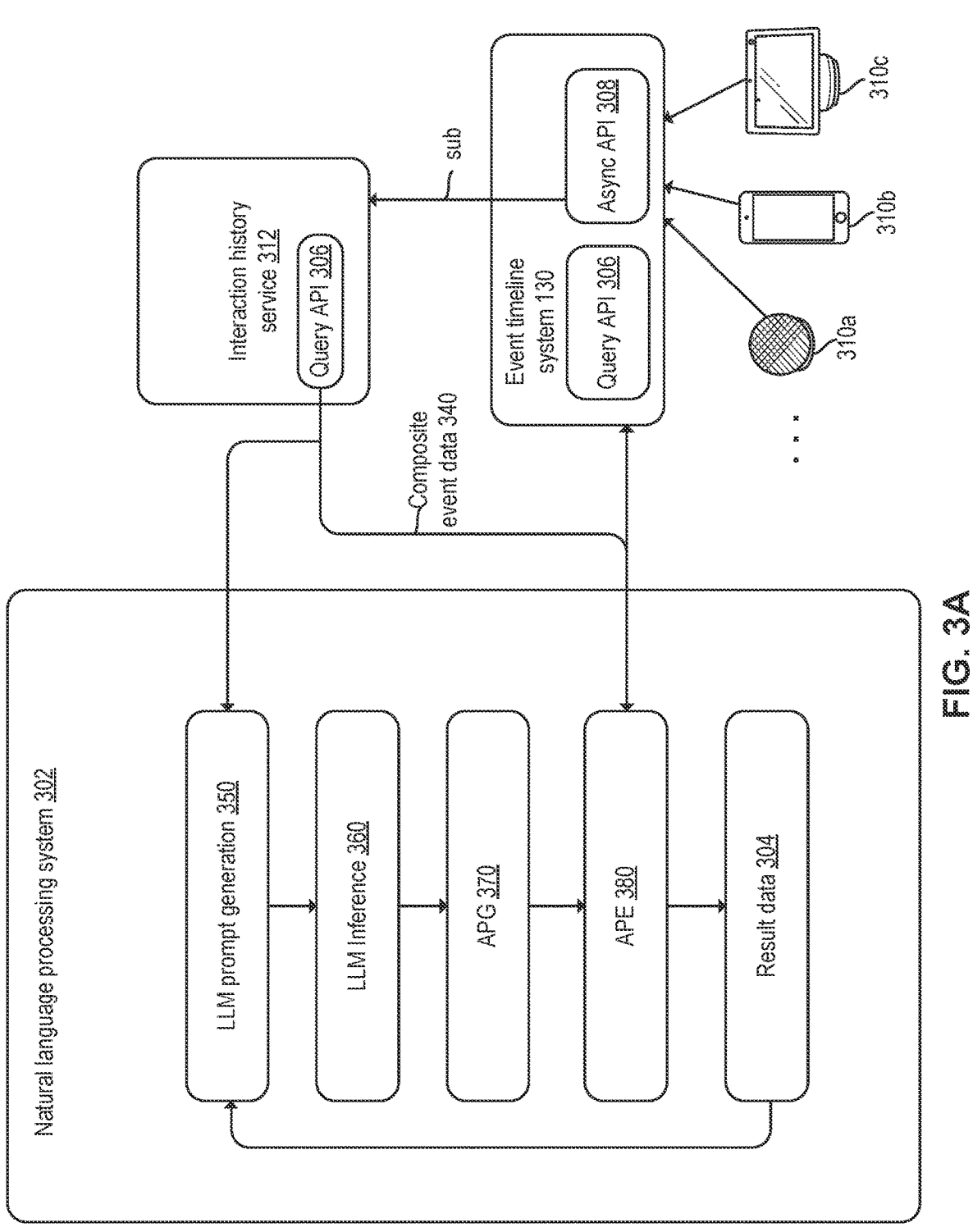
FIG. 3A depicts an example of a large language model (LLM)-based natural language processing system in communication with an event timeline system, in accordance with various examples described herein.

FIG. 3A depicts an example of a large language model (LLM)-based natural language processing system 302 in communication with event timeline system 130, in accordance with various examples described herein. In various examples, a natural language processing-enabled device (e.g., one or more of smart speaker device 310a, mobile device 310b (e.g., a mobile phone or tablet), display device 310c, etc.) may be effective to receive spoken requests (e.g., via one or more microphones) and/or other natural language requests (e.g., written text) and may process the received input using various components shown in FIG. 3A (executed locally on-device, on one or more devices communicating with the natural language processing-enabled device, or some combination of local and remote execution) to take one or more actions and/or perform requested tasks. In some examples, if the input request is a spoken request, ASR processing may be used to transform the spoken request into text prior to taking the actions described in FIG. 3A.

An LLM orchestrator (e.g., LLM orchestrator 730 described below in reference to FIG. 7) may be effective to receive the text data representing the request and may communicate the text data to the LLM prompt generation component 350. In some examples, the LLM prompt generation component 350 may query the event timeline system 130 to retrieve contextual information related to the user request. For example, in some examples the LLM prompt generation component 350 may itself be implemented as an LLM and may determine that the user request relates to turning off the lights. As such, the LLM prompt generation component 350 may query the event timeline service (e.g., via query API 306) to retrieve device state data from the home associated with the account ID (e.g., the account ID of the device that received the user request (e.g., display device 310c). The query may include the account ID and, in response to the query, the event timeline system 130 may return device state data of smart devices registered to the account ID provided in the query. The LLM prompt generation component 350 may insert this state information into the prompt used for LLM inference. For example, the prompt may include the text representing the user request (e.g., "Turn off the light in here") along with the device state data as context (e.g., Device_ID: 1234; Device_type [smartlight]; Device_state: ON; Device_ID: 2345; Device_type [smartlight]; Device_state: OFF, etc.).

Figure 3B:
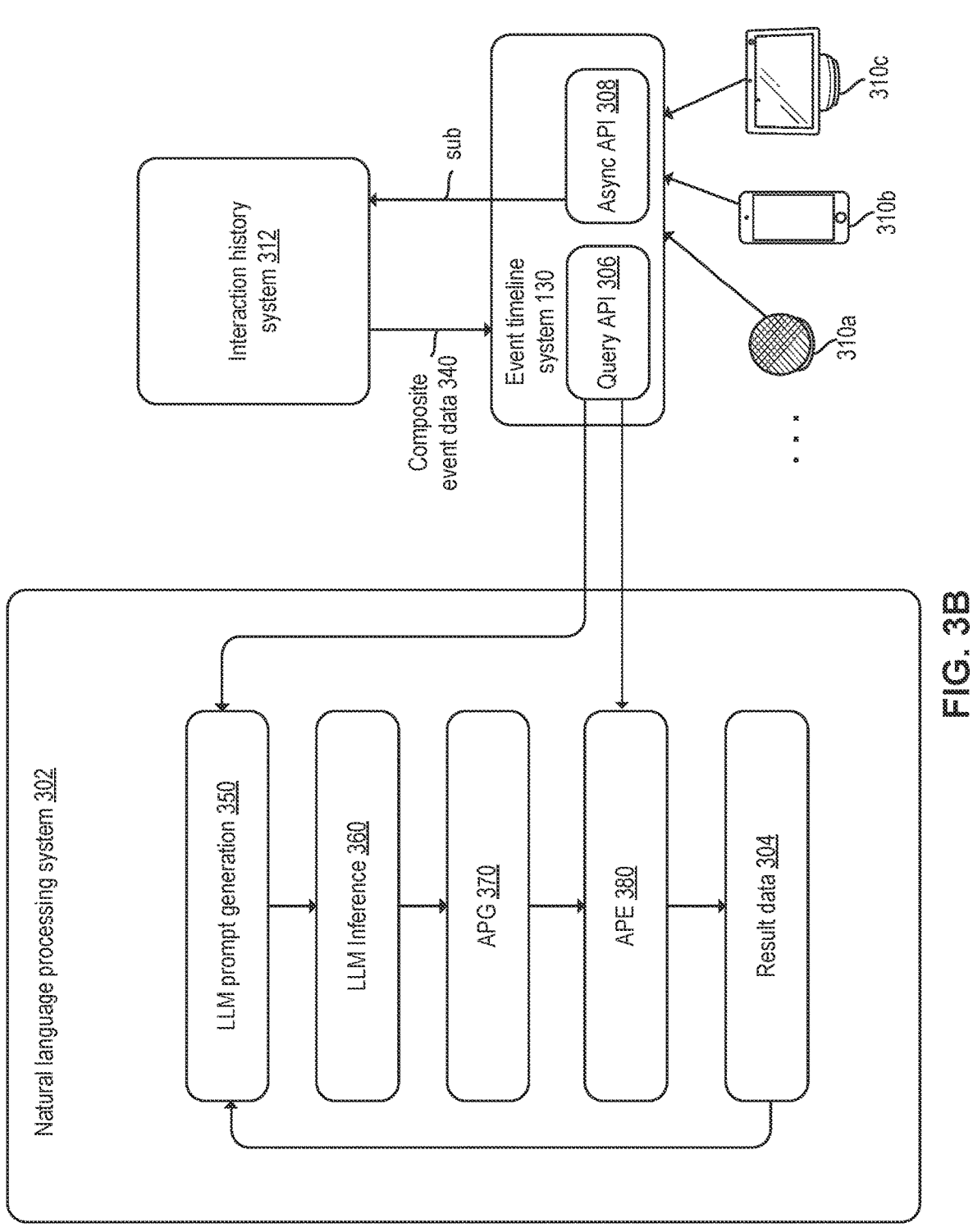
FIG. 3B depicts an alternate implementation of communication between the LLM-based natural language processing system and the event timeline system.

Accordingly, LLM inference 360 may consider the user request in view of the context data in the prompt when generating LLM inference output. The LLM inference output may be natural language text comprising a series of actions or tasks to be performed. For example, the LLM may generate a series of observations, such as "I can determine in which room the user audio has been received and determine which lights are on in the vicinity of that room."). The action plan generator 370 (APG 370) may receive the LLM inference output and may generate a series of computer-executable API and/or function calls that may be used to carry out one or more tasks in the LLM inference output. For example, the APG 370 may generate a call to an API of an in-home security sensor to determine a room in which the user making the request is located. The action plan generated by APG 370 may be sent to the action plan executor 380 which may carry out the relevant API calls of the action plan. In some examples, the action plan generated by the APG 370 may comprise retrieving further event data from the event timeline system 130. For example, the home security sensor may provide presence detection event data to the event timeline service (e.g., via asynchronous API 308). Accordingly, the APG 370 may generate an API call to the query API 306 to retrieve the relevant event type related to presence detection from persistent storage (e.g., low-latency store 120). The APE 380 may execute the API call and may retrieve the result data 304 from the event timeline system 130. In another example, the interaction history system 312 may subscribe to one or more event types registered with the event timeline system 130. In the current example, the presence information may be an event type to which the interaction history system 312 subscribes. The interaction history system 312 may receive various event data and may combine the various event data into composite event data. For example, events indicating that a first device was powered off, a home security system was armed, and a door was locked may be stitched into a composite event (that indicates that the user may be going to sleep). The interaction history system 312 may receive the presence information event type, generate one or more composite events (e.g., composite event data 340) and may store this data locally (or may send this data to event timeline system 130, as shown in FIG. 3B). Accordingly, the APG 370 may instead query the presence information from the query API 306. In some examples, having an intermediate service, such as interaction history system 312 may be used to anonymize data and/or to provide added security. For example, while the presence data may identify a particular user, the event data provided by the interaction history system 312 may provide only a Boolean value indicating whether any human has been detected in a particular location.

As described herein, processing by the LLM-based natural language processing system 302 may be recursive in nature, with a task requested by an input request being broken down into a variety of sub-tasks. In various examples, the LLM 360 and action plan generator 370 may generate action plans for the various subtasks. Execution of these action plans may include API calls to various other services and/or tools (e.g., SQL tools, programming tools, other purpose-built machine learning models, event timeline system 130, online search engines, etc.). Various parameters may be included in the API calls to these other services/tools (e.g., device identifier data, account identifier data, state data, etc.). The result data 304 may be used by LLM prompt generation component 350 to generate a new prompt to perform further tasks on the basis of the result data 304 received during the previous iteration. However, in some examples, the result data 304 may be determined to be a complete response to the user's question. Accordingly, in such instances the LLM orchestrator may take the requested action and/or may output the relevant response to the user's request.

FIG. 3B depicts an alternate implementation of communication between the LLM-based natural language processing system 302 and the event timeline system 130. In the example of FIG. 3B, the interaction history system 312 may subscribe to particular event types published to the event timeline system 130. The interaction history system 312 may generate composite events (composite event data 340) by combining event data according to predefined event histories (e.g., of a predefined format). For example, a user's vehicle arriving home, followed by a garage door open event, and a door unlock event may be a predefined event history. This may be a predefined event history that may be useful as context for processing by the LLM-based natural language processing system 302. The interaction history system 312 may send the composite event data 340 to the event timeline system 130 and the event timeline system 130 may store the composite event data 340 (e.g., in low-latency store 120, long-term store 122, and/or offline store 124) and/or may send the composite event data 340 to one or more subscribing devices and/or services via the asynchronous event driven architecture.

As previously described, the prompt data generated for LLM inference 360 may include event data as context to ground the prompt data and the input user query. For example, the composite event data 340 may be inserted into the prompt data. In various examples, timestamped event data from a variety of diverse devices and/or services may provide context that may be used to ground prompt data. However, in order to avoid prompt bloat and/or to provide the most relevant context for LLM inference 360, the event data may be summarized for prompt inclusion.

One technique that may be used to summarize event data for prompt inclusion is to build a semantic search index by encoding the various event data (e.g., using an encoder such as BERT, DistilBERT, etc.) into a high dimensional numeric vector. Thereafter, an input user query may be used to search the semantic search index by encoding the vector into the common embedding space and determining the most similar embeddings stored in the semantic search index (e.g., using cosine distance, cosine similarity, Euclidean distance, etc.). Such a technique may be used to retrieve the top k most relevant events (and/or composite events) which may be included in the prompt as potentially useful context together with the user input request.

Another technique that may be used to summarize event data for prompt inclusion (which may be used alone or together with one or more other approaches) may be to cache event data that is relevant to various predefined scenarios (e.g., for common experiences that can offer improved user experiences). For example, the LLM-based natural language processing system 302 may offer a sleep tracking user experience. For this user experience, a number of snoring audio events may be compiled. Accordingly, when a user asks "How often did I snore last night" the system may retrieve the predefined sleep event data (e.g., 24 hours worth of detected sleep events for a particular device ID) and may use this to determine the length of time and/or the number of snoring events. The foregoing event summary (e.g., sleep-related audio events) is merely an illustrative example and the specific event summaries may be engineered for the particular user experiences to be offered.

Figure 3C:
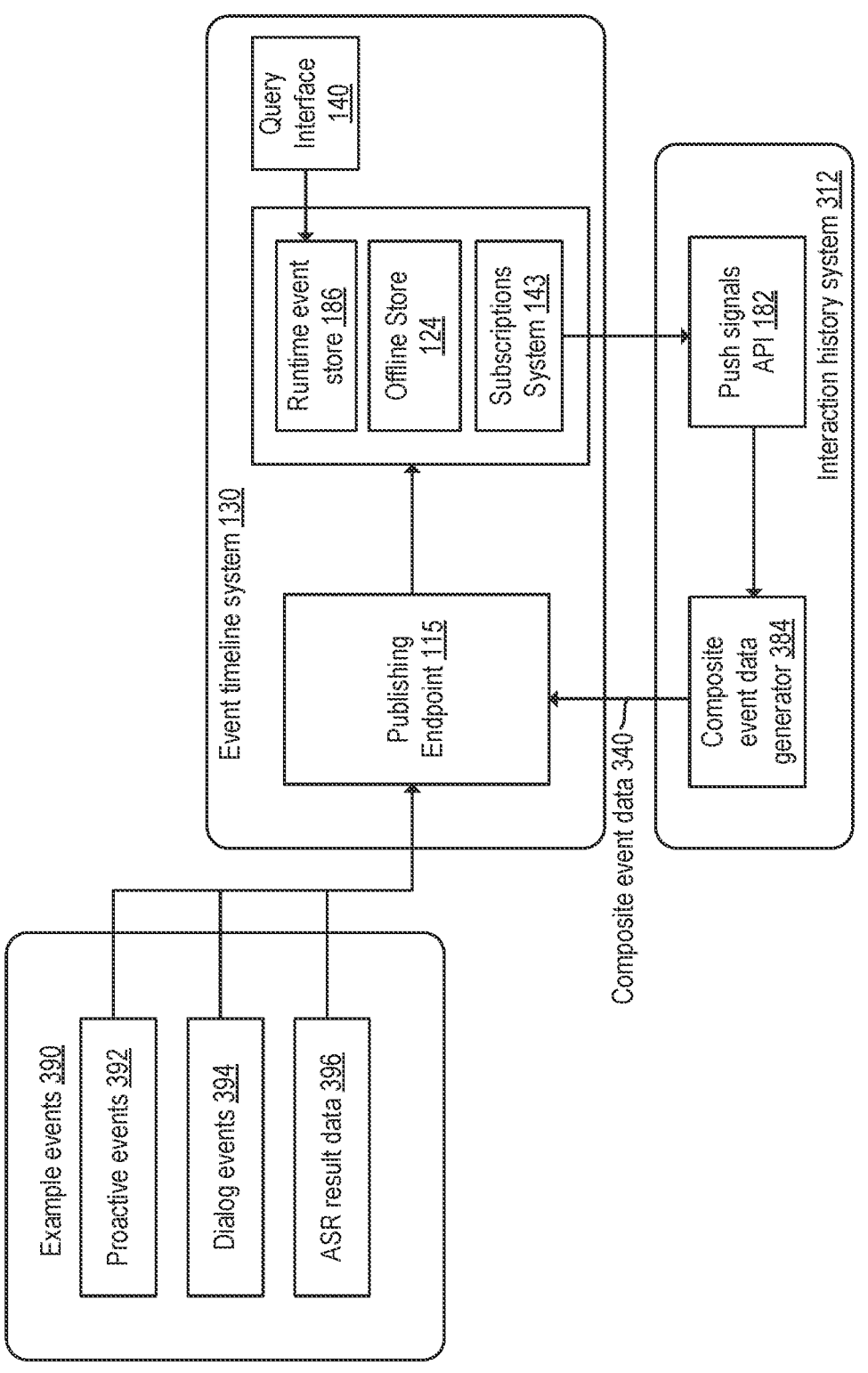
FIG. 3C depicts a block diagram illustrating example interaction between the event timeline system and the interaction history system, in accordance with various aspects of the present disclosure.

FIG. 3C depicts a block diagram illustrating example interaction between the event timeline system 130 and the interaction history system 312, in accordance with various aspects of the present disclosure. In the example depicted in FIG. 3C, various example events 390 (e.g., timestamped event data) are shown by way of example only. Event data may comprise any time of timestamped data generated by a device and/or computer-implemented system. The example events 390 include proactive events 392 such as notifications, EDA message data, and other generated device and/or system events (e.g., generated as part of a system log and/or application log) that may be published using an EDA to the publishing endpoint 115 of event timeline system 130. Additionally, the example events 390 include dialog events 394 (e.g., dialog history) including past turns of dialog between a user and a natural language processing system. Additionally, the example events 390 include ASR result data 396 which may include ASR hypotheses for input user speech as well as their associated confidence scores. It should be noted that these example events 390 are merely examples of the types of timestamped event data that may be received by the event timeline system 130 from a diverse set of devices and/or systems.

The publishing endpoint 115 may send the event data to the appropriate component of event timeline system 130 (e.g., as determined by event router 108 of FIG. 1A). Runtime event store 186 may be, for example, a low latency cache of event data that is persisted for a relatively short time (e.g., during a dialog session). Offline store 124 may store data for bulk access, as previously described. Subscription systems 143 may be a message broker of an EDA and may publish timestamped event data to subscribers of event data of the relevant type.

In the example of FIG. 3C, the interaction history system 312 subscribes to certain event types and thus receives subscribed-to event data at a push signals API 182 of the interaction history system 312. The push signals represent the timestamped events to which the interaction history system 312 subscribes.

The composite event data generator 384 may be used to generate the composite event data 340. For example, the composite event data generator 384 may generate composite events (composite event data 340) by combining event data according to predefined event histories (e.g., of a predefined format). For example, a user's vehicle arriving home, followed by a garage door open event, and a door unlock event may be a predefined event history. This may be a predefined event history that may be useful as context for processing by the LLM-based natural language processing system 302. The composite event data 340 generated by the composite event data generator 384 may comprise logic to modify received event data, aggregate received event data, and/or extract values from received event data to be combined according to a certain predefined composite event data format or schema. For example, for a particular system log event received, the composite event data generator 384 may extract a value from a particular field for inclusion in composite event data 340 while excluding other information from the system log event. In an aggregation example, the composite event data generator 384 may include all events of a certain type that occurred over a given time period (e.g., the number of times that presence information was detected by a camera device or presence sensor over a 24 hour time period). In still further examples, the event data may be transformed (e.g., according to predefined functions executed by the composite event data generator 384). For example, certain values may be extracted from a received event and may be transformed according to a predefined function. A naïve example may be transforming event data from one unit type (e.g., Fahrenheit) to another unit type (e.g., Celsius).

The interaction history system 312 may send the composite event data 340 to the event timeline system 130 (e.g., to publishing endpoint 115) and the event timeline system 130 may store the composite event data 340 (e.g., in low-latency store 120, long-term store 122, and/or offline store 124) and/or may send the composite event data 340 to one or more subscribing devices and/or systems via the asynchronous event driven architecture. Additionally, consuming systems may use query interface 140 to retrieve the composite event data 340.

Figure 4:
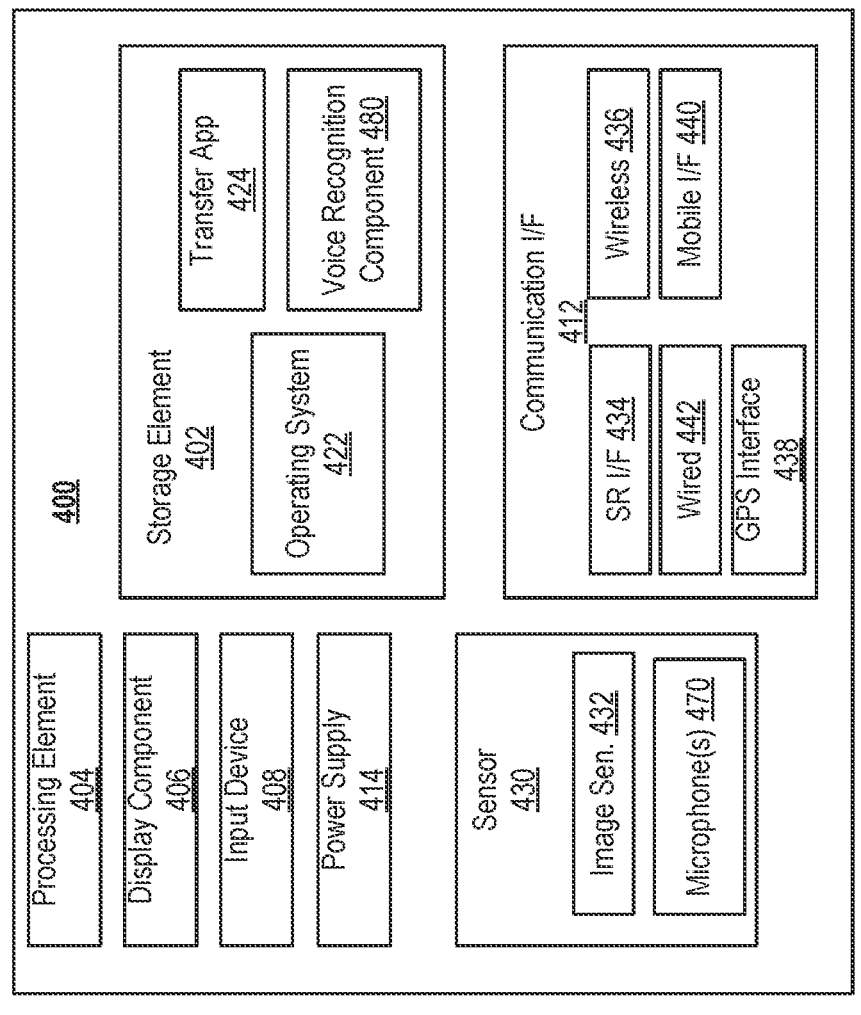
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as smart speaker device 310a, mobile device 310b (e.g., a mobile phone or tablet), display device 310c, and/or another device). In various examples, the architecture 400 may be an example of a device that may send event data (e.g., an event publisher 106) to event timeline system 130. In some further examples, architecture 400 may be an example of a device that may implement all or part of a natural language processing system that may be a consumer of event data provided by the event timeline system 130. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
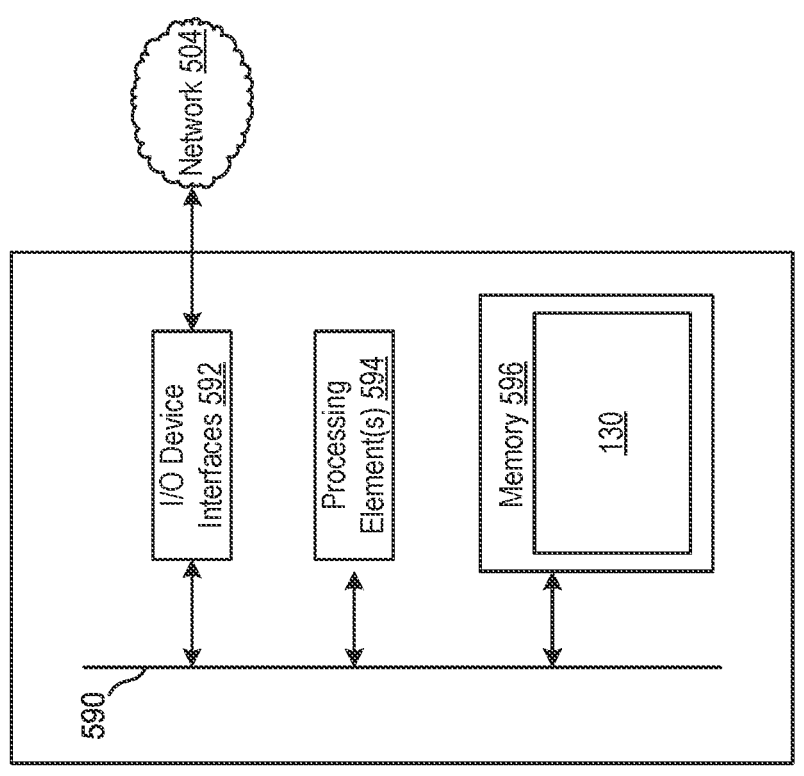
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., LLM-based system 100 etc.) and/or command processing. For example, the various components of FIG. 5 may be used to implement the event timeline system 130 and/or one or more components of the LLM-based natural language processing system 302. Multiple computing devices may be included in the system, such as one speech processing computing device for performing ASR processing, one or more other devices for LLM inferencing, one or more other computing devices executing computer-implemented services used by the LLM orchestrator, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the LLM 80, such as machine learned models associated with various classifiers and/or natural language inference models (described in reference to FIG. 1A), when loaded from memory 596. In various further examples, memory 596 may be effective to store instructions effective to program controllers/processors 594 to perform the various techniques described above in reference to FIGS. 1-3. Accordingly, in FIG. 5, the LLM-based system 100 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of the LLM-based system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of the various computing devices described herein may include input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

FIG. 6 is a flow chart illustrating an example process for retrieving diverse device data for LLM prompt generation, in accordance with embodiments of the present disclosure. The process 600 of FIG. 6 may be executed by one or more computing devices. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5. Although shown in a particular order, the steps of process 600 may instead be performed in a different order. Additionally, various steps may be performed in parallel in various implementations. Further, some steps may be omitted and/or other steps may be added in accordance with the action validation and/or indirect prompt injection detection techniques described herein.

Process 600 may begin at action 602, at which a first natural language input may be received. The first natural language input may comprise a natural language request (e.g., spoken or text-based) to answer a question, perform an action (e.g., open a door, open blinds, operate an appliance, play a song or other content, etc.), set a timer, establish a routine, etc. In a running example used for illustrative purposes, the user may request that their goodnight routine be executed. In some examples, the user may have previously established a goodnight routine that may include turning off various smart lights and/or other electronics, arming their security system, etc. In some other cases, the LLM may determine the most appropriate actions for a goodnight routine from the latent information learned during training.

Processing may continue at action 604, at which first prompt data comprising the first natural language input and an account identifier may be generated. In some examples, the account identifier may be the registered account associated with the device receiving the first natural language input. In at least some examples, this metadata (the account ID) may be provided with the first natural language input. However, in some other examples, the LLM may generate an action plan during a prior iteration that comprises an API call to retrieve relevant account identifiers associated with the devices communicating on a local area network with the device receiving the first natural language input.

Processing may continue at action 606, at which the LLM may use the first prompt data to generate first action plan data comprising a first API call to a first computer-implemented service, the first API call including the account identifier. For example, the LLM may use an API call associated with the query interface 140 of the event timeline system 130 and/or an API call associated with the query API 306 of the interaction history system 312 to retrieve device state data for devices registered for the account identifier. Accordingly, the API call may include the account identifier as an argument/input parameter. The various devices may send timestamped event data to the event timeline system 130 (e.g., using an asynchronous EDA API). In at least some examples, such event data (including current state data and/or state change information) may be stored in low-latency store 120.

Processing may continue at action 608, at which first result data may be received from the first computer-implemented service in response to the first API call. The first result data may include a first series of time-stamped events associated with a first device registered in association with the account identifier. For example, the first series of time-stamped events may indicate that a home security system (e.g., the first device) registered in association with the account identifier was armed at 7:57 pm, and was then changed to a disarmed state at 9:41 pm.

Processing may continue at action 610, at which second result data may be received from the first computer-implemented service in response to the first API call. The second result data may include a second series of time-stamped events associated with a second device registered in association with the account identifier. For example, the second series of time-stamped events may indicate that a smart lock (e.g., the second device) registered in association with the account identifier was locked at 7:54 pm, and was then unlocked at 9:42 pm. In some examples, the first result data and the second result data may be received together as composite event data (e.g., composite event data 340 including a series of timestamped event data generated by different devices and/or services). As previously described, in some examples, the first result data and the second result data may be retrieved using the input user request (e.g., the first natural language input) to perform a semantic search for the most relevant event data stored by the event timeline system 130. For example, the first natural language input may be encoded into a vector representation (e.g., using a natural language encoder such as BERT, Word2Vec, etc.). The vector representation may be used to search a semantic embedding space that includes embeddings of various event data and/or composite event data. The most similar embeddings may be retrieved using a similarity metric such as cosine distance, cosine similarity, etc. In various other examples, the first natural language input may be used to retrieve one or more predefined event histories related to specific user experiences (e.g., there may be a certain set of event data retrieved when a user arrives at home, a second set of event data retrieved when a user is determined to be going to sleep, a third set of event data retrieved when the user is cooking, etc.). It should be noted that while the example in FIG. 6 describes retrieval of first and second result data from first and second devices in response to the first API call, in general, when the event timeline system 130 is called, a diverse set of timestamped event data may be returned which may be from any number of devices and/or computer-implemented services in order to provide the most relevant context.

Processing may continue at action 612, at which second prompt data may be generated that includes the first natural language input, the first result data, and the second result data. For example, the second prompt data may include text of the initial request ("I am going to bed; execute my goodnight routine."), along with the state change and current state information for both the home security system (the first device) and the smart lock (the second device). The LLM may use the first result data and the second result data as context to determine what action(s) to take next in order to carry out the user's request.

Processing may continue to action 614, at which the LLM may generate, using the second prompt data, a first output action responsive to the first natural language input. For example, the LLM may determine that the home security system is to be armed and the smart lock is to be locked. Accordingly, the LLM may generate relevant API calls to arm the home security system and lock the smart lock. Accordingly, the first output action may comprise sending executable control instructions to arm the home security system and/or to lock to the smart lock.

Figure 7:
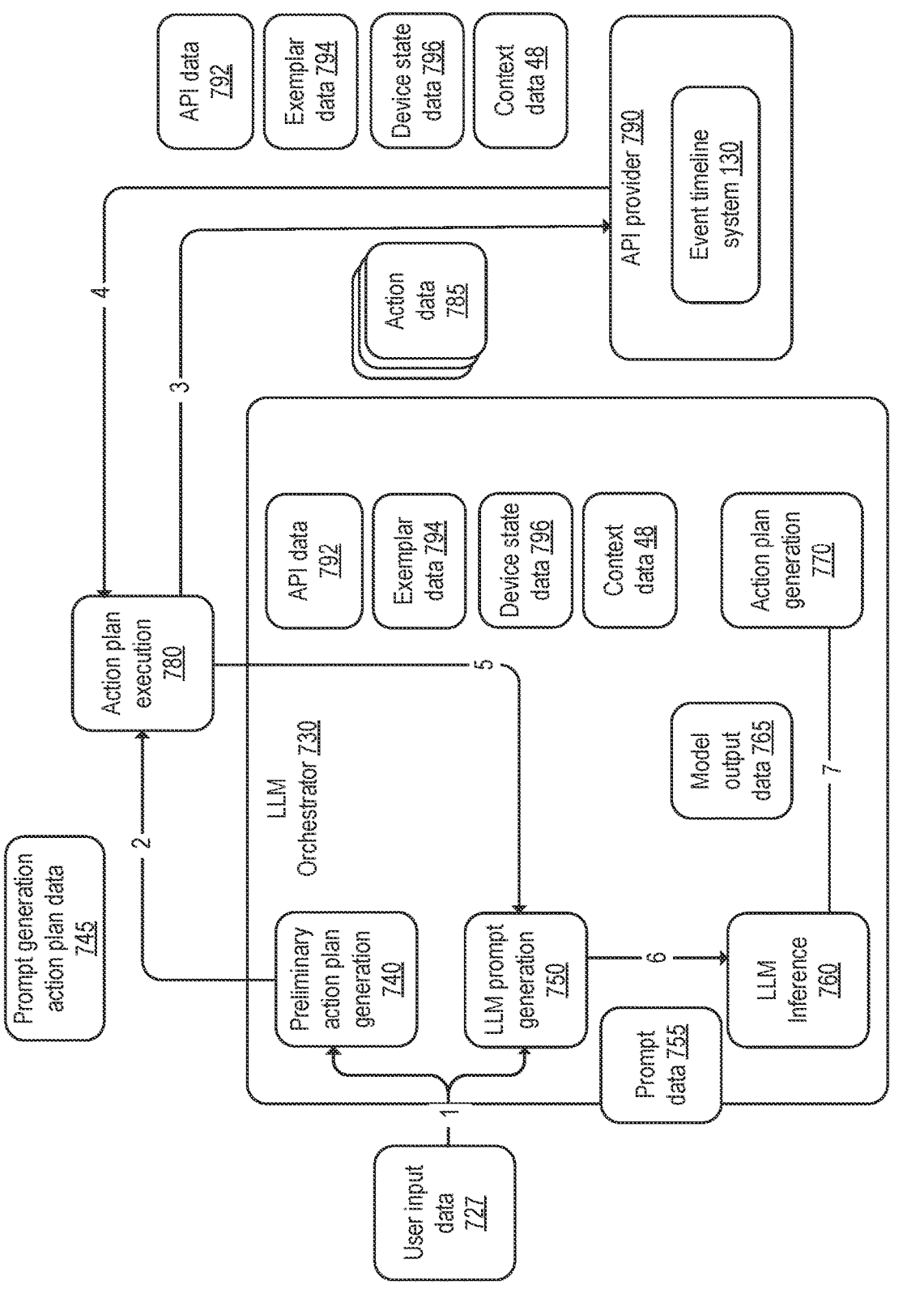
FIG. 7 depicts an example LLM-based natural language processing flow, in accordance with various aspects of the present disclosure.

FIG. 7 depicts an example LLM-based natural language processing flow (which may be an example LLM architecture (e.g., of LLM 80 described above), in accordance with various aspects of the present disclosure. The example architecture in FIG. 7 is similar to the architecture described above in reference to FIG. 3 and may include some of the same or similar components. With reference to FIG. 7, the LLM orchestrator 730 may include a preliminary action plan generation component 740, a LLM prompt generation component 750, an LLM 760, and an action plan generator 770. In various examples, the LLM 760 may be a generative model.

In some examples, the LLM 760 may be a transformer-based seq2seq model involving an encoder-decoder architecture. In some such embodiments, the LLM 760 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM 760 may be pre-trained with approximately 1 trillion tokens. Being trained on CLM tasks, the LLM 760 may be capable of in-context learning. An example of such a LLM is Alexa Teacher Model (Alexa™).

In various examples, the input to the LLM 760 may be in the form of a prompt. A prompt may be a natural language input, for example, an instruction, for the LLM 760 to generate an output according to the prompt. The output generated by the LLM 760 may be a natural language output responsive to the prompt. The prompt and the output may be text in a particular spoken language. For example, for an example prompt "how do I cook beans?", the LLM 760 may output a recipe (e.g., a step-by-step process) to cook beans. As another example, for an example prompt "I am hungry. What restaurants in the area are open?", the LLM may output a list of restaurants near the user that are open at the current time.

The LLM 760 may be configured using various learning techniques. For example, in some embodiments, the LLM 760 may be configured (e.g., "fine tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LLM 760 may be configured using one-shot learning, which is similar to few-shot learning, except the model is provided with a single example. As another example, in some embodiments, the LLM 760 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator 730 may be configured for generating the prompt to be used by the LLM 760 to determine an action responsive to a user input. As shown in FIG. 7, the LLM orchestrator 730 receives (at step 1) user input data 727. In some instances, the user input data 727 may correspond to text or tokenized representation of a user input. For example, prior to the LLM orchestrator 730 receiving the user input data 727, another component (e.g., an ASR component) may receive audio data representing the user input. The ASR component may perform ASR processing on the audio data to determine ASR output data corresponding to the user input. As previously described, the ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 727 may include a top scoring ASR hypothesis of the ASR data.

As illustrated in FIG. 7, the user input data 727 may be received at the preliminary action plan generation component 740 and the LLM prompt generation component 750 of the LLM orchestrator 730. The preliminary action plan generation component 740 processes the user input data 727 to generate prompt generation action plan data 745 corresponding to an instruction(s) (e.g., a request(s)) for one or more portions of data usable to generate a language model prompt for determining an action responsive to the user input). In some examples, the one or more portions of data may be data that is determined to be relevant for processing of the user input. In various examples, the event timeline system 130 may be queried to obtain such context data 48 that may be used during prompt generation. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the user input data 727 represents a user input of "please turn on the kitchen lights every morning at 7 am," then the preliminary action plan generation component 740 may determine prompt generation action plan data 745 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. As previously described, devices and/or services may publish timestamped event data to the event timeline system 130 and the LLM may execute API calls to the query interface 140 of the event timeline system 130 to retrieve such data that may thereafter be used in prompts for subsequent iterations of LLM processing.

For further example, if the user input data 727 represents a user input of "What is the elevation of Mt. Everest," then the preliminary action plan generation component 740 may determine prompt generation action plan data 745 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant.

In some examples, the prompt generation action plan data 745 may include one or more executable API calls usable for retrieving the one or more portions of data from the corresponding component. For example, instructions included in the prompt generation action plan data 745 may include "FETCH_API," "FETCH EXEMPLAR," "FETCH_DEVICE_STATE," "FETCH_CONTEXT," etc., along with optional API arguments/inputs. In some embodiments, the prompt generation action plan data 745 may also include the user input data 727. The prompt generation action plan data 745 may be sent (at step 2) to the action plan executor 780.

In some examples, the preliminary action plan generation component 740 may be configured to process the user input data 727 to determine a representation of the user's request. In various examples, the representation of the user's request may be a reformulation of the user's request. For example, the if the user input data 727 represents a user input of "I have always wanted to travel to Japan, I have heard it's beautiful. How tall is Mt. Fuji?", then the preliminary action plan generation component 740 may determine the representation of the user's request as being "How tall is Mt. Fuji," or the like. The preliminary action plan generation component 740 may generate the prompt generation action plan data 745 using the determined representation of the user's request.

In some examples, the preliminary action plan generation component 740 may implement one or more machine learning (ML) models. A first ML model(s) may be configured to take as input the user input data 727 and generate a representation of the user's request. For example, the ML model may be a text summarization model or a text rewrite model. A second ML model (or the first ML model) may be configured to take as input the representation of the user's request (or the user input data 727) and determine the one or more portions of data relevant for processing of the user input. For example, the second ML model may be a classifier trained to classify the user's request (or the user input data 727) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.).

In other embodiments, the preliminary action plan generation component 740 may be an LLM, similar to the LLM 760. In such embodiments, the architecture may include a further component configured to generate a prompt to be provided to the LLM (e.g., similar to the LLM prompt generation component 750) or the prompt may be generated by the LLM prompt generation component 750. The component may generate a prompt (e.g., according to a template) including the user input data 727 and instructions to determine the one or more portions of data (e.g., contextual data or other types of data) relevant to the processing of the user input. The LLM may process the prompt and generate model output data representing the one or more portions of data (or types of data). The preliminary action plan generation component 740 may process the model output data to determine the prompt generation action plan data 745.

The action plan executor 780 may process the prompt generation action plan data 745 to execute the one or more instructions to retrieve/receive data corresponding to the user input and that may be used to generate the language model prompt (e.g., including time series event data retrieved from the event timeline system 130). As shown in FIG. 7, the action plan executor 780 processes the prompt generation action plan data 745 to generate action data 785 representing an action included in the prompt generation action plan data 745 (e.g., a single instruction, such as FETCH_CONTEXT). For example, in the situation where the action is represented by an API call, the action data 785 may represent the action plan executor 780 executing the API call included in the prompt generation action plan data 745. The action data 785 may be sent (at step 3) to the API provider component 790. In the situation where the prompt generation action plan data 745 includes more than one instruction, the action plan executor 780 may generate more than one instance of action data 785 (e.g., one instance for each instruction included in the prompt generation action plan data 745) and send each instance to the API provider component 790.

The API provider component 790 may process the (one or more instances of the) action data 785 and cause the retrieval of the (one or more portions of) data associated with the action data 785 (e.g., result data). The API provider component 790 may include a knowledge provider component and/or the event timeline system 130 (among other potential API providers). The knowledge provider component may include an API retrieval component, an exemplar retrieval component, a device state retrieval component, and an "other" context retrieval component. The knowledge provider component may provide the action data 785 to the component(s) configured to determine the data corresponding to the request(s) represented by the action data 785.

For example, the API retrieval component (not shown) may process the action data 785 to generate API data 792 representing one or more APIs that correspond to an action performable with respect to the user input. For example, if the user input corresponds to "turn on the kitchen light," the API retrieval component may determine an API usable to control a device and include an API definition corresponding to the API in the API data 792. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 792 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 792. In some embodiments, the API retrieval component may include the top-n identified API definitions in the API data 792. The API data 792 may be sent (at step 4) to the action plan executor 780 as shown in FIG. 7.

For further example, the exemplar retrieval component may process the action data 785 to generate exemplar data 794 representing one or more exemplars associated with one or more APIs (e.g., the API represented by the API data 792). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 794 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action (device: str)" and "Routine.create_time_trigger (hour: [hour value])" and the current user input "please turn on the kitchen light everyday at 7 am," the exemplar retrieval component may select an exemplar representing:

```
{
  Customer: turn on the kitchen light everyday at 7 am
  Thought: the customer is trying to create a routine
  Action:
  Routine.create_routine (trigger-Routine.create_time_trig-
    ger (hour=7), action=Routine.create_turn_on_action
    (device="kitchen light"))
  Observation: routine created successfully
  Thought: time to respond
  Response: I have created a routine for you. Anything else?
}
```

Although not illustrated in FIG. 7, in some embodiments, the API provider component 790 and/or a knowledge provider component may provide the exemplar retrieval component with the action data 785 and a list of API call(s) to which the determined exemplars are to be associated (e.g., the API call(s) included in the API data 792). In some embodiments, the one or more exemplars may be included in the exemplar data 794 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 794. In some embodiments, the exemplar retrieval component may include the top-n identified exemplars in the exemplar data 794. The exemplar data 794 may be sent (at step 4) to the action plan executor 780 as shown in FIG. 7.

As another example, a device state retrieval component (not shown in FIG. 7) may process the action data 785 to generate device state data 796 representing one or more states of one or more devices associated with/relevant to the user input (e.g., whether the device is powered on or off, a volume level associated with the device, etc.). For example, if the user input corresponds to "Please turn on the kitchen light," the device state data 796 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 796. As previously described, in some examples, the event timeline system 130 may provide the device state data 796 and/or other context data 48. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 796. The device state data 796 may be sent (at step 4) to the action plan executor 780 as shown in FIG. 7.

As a further example, a context retrieval component (not shown) may process the action data 785 to generate other context data 48 (apart from the device state data 796, the API data 792, the exemplar data 794, etc.) representing one or more contexts associated with/relevant to the user input. For example, the other context data 48 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 48 may include the top-n identified context in the other context data 48. The other context data 48 may be sent (at step 4) to the action plan executor 780 as shown in FIG. 7.

In some embodiments, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 792) indicates that a related API definition was identified, then the knowledge provider component (or another component) may cause the exemplar retrieval component to process to determine one or more exemplars related to the identified API definitions. For further example, if the output of the API retrieval component (e.g., the API data 792) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 740, as discussed above).

The action plan executor 780 may send (step 5) the data received from the API provider component 790 (e.g., the API data 792, the exemplar data 794, the device state data 796, and the other context data 48) to the LLM prompt generation component 750. The LLM prompt generation component 750 may be configured to generate prompt data 755 (e.g., using the user input data 727, the API data 792, the exemplar data 794, the device state data 796, and/or the other context data 48) to be used by the LLM 760.

In some examples, the LLM prompt generation component 750 may generate the prompt data 755 representing a prompt for input to the LLM 760. The prompt data 755 may include time series event data retrieved from the event timeline system 130 as context (e.g., as context data 48 and/or device state data 796). In some embodiments, such prompt data 755 may be generated based on combining the user input data 727, the API data 792, the exemplar data 794, the device state data 796, and the other context data 48. The prompt data 755 may be an instruction to determine an action(s) responsive to the user input data 727 given the other information (e.g., the API data 792, the exemplar data 794, the device state data 796, the other context data 48) included in the prompt data 755. In some embodiments, the LLM prompt generation component 750 may also include in the prompt data 755 a sample processing format to be used by the LLM 760 when processing the prompt and generating the response. In some embodiments, the prompt data 755 may be generated according to a template format. For example, the prompt data 755 may adhere to a template format of:

{
You have access to the following API's:
[API(s) (e.g., the API data 192)]
Use the following format:
User: the input utterance of a user
Thought: optionally think about what to do
Action: take an action by calling APIs
Observation: what the API execution returns
. . . (this thought/action/action input/observation can repeat N times)
Thought: done
Response: the proper response to the user (end of turn)

Examples
[Exemplar(s) (e.g., the exemplar data 794)]
Context: [device state(s) (e.g., the device state data 796)]
    [other context(s) (e.g., the other context data 48)]
User: [the user input (e.g., the user input data 727)]
}

In some examples, the template format may instruct the LLM 760 as to how it should process to determine the action responsive to the user input and/or how it should generate the output including the action response to the user input. For example, as shown in the example above, the format may include the directive tag "User:" labelling the following string of characters/tokens as the user input. For further example, the format may include the directive tag "Thought:" instructing the LLM 760 to generate an output representing the determined interpretation of the user input by the LLM 760 (e.g., the user is requesting [intent of the user input], the user is trying to [intent of the user Input], etc.) As another example, the format may include the directive tag "Observation:" labeling the following string of characters/tokens as the result of performance of an action determined by the LLM 760/the LLM 760's interpretation of the result of the performance of the action determined by the LLM 760. As a further example, the format may include a directive tag of "Response:" instructing the LLM 760 to generate a response (e.g., a natural language output for a user) to the prompt.

Following such a template format, for example, and for a user input of "turn on the living room light" and corresponding API data, exemplar data, device state data, and other context data, the LLM prompt generation component 750 may generate example prompt data 755*a*:
{
You have access to the following API's:
Routine.turn_on_device (device: [device name]) turns a
    device on.
Use the following format:
User: the input utterance of a user
Thought: optionally think about what to do
Action: take an action by calling APIs
Observation: what the API execution returns
. . . (this thought/action/action input/observation can
    repeat N times)
Thought: done
Response: the proper response to the user (end of turn)
Examples
User: turn on all indoor lights
Thought: the user is trying to turn lights on
Action: turn_on_device (device="indoor light 1")
turn_on_device (device="indoor light 2")
Observation: success success
Thought: time to respond
Response: Anything else I can help you with?
Context: the user has the following devices, bathroom
    light, bedroom light, kitchen light, and living room
    light.
User: turn on the living room light.
}

In some embodiments, the LLM prompt generation component 750 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM 760 processes the prompt data 755 to generate model output data 765 representing an action responsive to the user input. For example, based on processing the example prompt data provided above, the LLM 760 may output model output data 765: {"Thought: the user is trying to turn on the living room light; Action: turn_on_device (device="living room light"),"} or the like. The model output data 765 is sent (at step 7) to the action plan generator 770. The action plan generator 770 may parse the model output data 765 to determine action plan data representing the action generated by the LLM 760. For example, for the model output data 765: "Action: turn_on_device (device="living room light")," the corresponding action plan data may correspond to "turn_on_device (device="living room light")" (e.g., corresponding to the action generated by the LLM 760, without the label of "Action"). In some embodiments, the action plan generator 770 may determine an API call corresponding to the "Action" data included in the model output data 765. For example, in some embodiments, the action plan generator 770 may fill in the arguments/inputs, if any, for the API call, which may be included in the action plan data. For further example, in some embodiments, the action plan executor 780 may fill in the arguments/inputs, if any, for the API call.

In some embodiments, the LLM orchestrator 730 (e.g., the action plan generator 770 or another component of the LLM orchestrator 730) may determine whether the LLM 760 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 730 may use a knowledge base, web search, etc. to fact-check information included in the output. It should be noted that the above description generally describes one iteration of LLM-based processing. However, the LLM orchestrator 730 may control the system to execute multiple iterations of LLM-based processing comprising a variety of sub-tasks used to fulfill the input request.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s).

The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
   receiving a first natural language input;
   generating first prompt data comprising the first natural language input and an account identifier;
   generating, by a large language model (LLM) using the first prompt data, first action plan data, wherein the first action plan data comprises a directive to send a first application programming interface (API) request to a first API of a first computer-implemented system, wherein the first API request comprises the account identifier;
   receiving first result data from the first computer-implemented system in response to the first API request, wherein the first result data comprises a first time-stamped event associated with a first device registered in association with the account identifier;
   receiving second result data from the first computer-implemented system in response to the first API request, wherein the second result data comprises a second time-stamped event associated with a second device registered in association with the account identifier;
   generating second prompt data comprising the first natural language input, first text data describing the first time-stamped event of the first result data, and second text data describing the second time-stamped event of the second result data; and
   generating, by the LLM using the first prompt data and the second prompt data, a first output action responsive to the first natural language input.

2. The computer-implemented method of claim 1, further comprising:
   receiving first event data related to the first output action by an asynchronous API of the first computer-implemented system;
   determining, by the first computer-implemented system, first configuration data in header data of the first event data;
   determining using the first configuration data in the header data that the first event data corresponds to a first event type;
   selecting a first data store for storage of the first event data, wherein data stored in the first data store is persisted by the first computer-implemented system for a first amount of time;
   receiving second event data related to a second output action by the asynchronous API of the first computer-implemented system;
   determining, by the first computer-implemented system, second configuration data in header data of the second event data;
   determining using the second configuration data in the header data that the second event data corresponds to a second event type; and
   determining that the second event type is associated with an event driven architecture;
   determining at least one subscriber system associated with the second event type; and
   sending the second event data to the at least one subscriber system.

3. The computer-implemented method of claim 1, further comprising:
   receiving, by the first computer-implemented system from a second computer-implemented system, a registration request for a first event type published by the second computer-implemented system, wherein the registration request comprises first schema data defining fields and expected data types for the first event type and second data defining an access type of the first event type;
   storing, by the first computer-implemented system, the first schema data and the second data in a first data store in association with the first event type;
   receiving, by the first API, a second API request for first event data associated with the first event type;

sending the first event data to the LLM;

generating a first encoded representation of the first event data;

generating third prompt data comprising the first encoded representation of the first event data; and generating, by the LLM based at least in part on the third prompt data, a second output action.

4. A method comprising:

receiving a first natural language input from a first device;

generating first prompt data comprising the first natural language input;

generating, by a large language model (LLM) using the first prompt data, a first directive to send a first request to a first interface of a first computer-implemented system, wherein the first computer-implemented system is different from the first device;

receiving first result data from the first computer-implemented system in response to the first request, wherein the first result data comprises a first time-stamped event associated with the first device or a second device;

generating second prompt data comprising the first natural language input and a representation of the first result data; and generating, by the LLM using the second prompt data, a first output action responsive to the first natural language input.

5. The method of claim 4, further comprising:

determining first account identifier data associated with the first natural language input; and sending the first account identifier data as a parameter in the first request to the first interface, wherein the first device is registered in association with the first account identifier data.

6. The method of claim 4, further comprising:

receiving first data representing a series of time-stamped events from an event-driven architecture of the first computer-implemented system;

storing the first data in a first data store associated with the LLM;

receiving a second natural language input;

generating third prompt data comprising the second natural language input and the first data; and generating, by the LLM using the third prompt data, a second output action responsive to the second natural language input.

7. The method of claim 4, further comprising:

receiving second result data in response to the first request, the second result data comprising a time series of event data, wherein a first event of the time series of event data is generated by the first device and wherein a second event of the time series of event data is generated by the second device; and generating the second prompt data further comprising data representing the first event and the second event.

8. The method of claim 4, further comprising:

receiving, by the first computer-implemented system, a first registration request comprising first identifier data identifying a first event type and first schema data defining organization of event data of the first event type; and storing, by the first computer-implemented system, the first identifier data in association with the first schema data in memory.

9. The method of claim 8, further comprising:

receiving, by the first computer-implemented system, first data specifying an access type for the first event type, wherein the first data specifies an asynchronous messaging API;

receiving, by the first computer-implemented system from a remote computing device, a first subscribe request for the first event type;

receiving, by the first computer-implemented system, first published event data of the first event type; and sending, by the first computer-implemented system to the remote computing device, the first published event data using the asynchronous messaging API.

10. The method of claim 4, further comprising:

receiving first event data by a second interface of the first computer-implemented system;

determining, by the first computer-implemented system, first configuration data in header data of the first event data;

determining using the first configuration data in the header data that the first event data corresponds to a first event type; and storing the first event data in a first data store that is associated with the first event type.

11. The method of claim 4, further comprising generating a first composite event comprising a first value extracted from first event data and a second value extracted from second event data, wherein the first result data comprises the first composite event.

12. The method of claim 4, further comprising:

determining, by the LLM, that the first result data comprises a first acoustic event or a first video event;

determining, by the LLM, a natural language description of the first acoustic event or the first video event; and generating the first output action based at least in part on the natural language description of the first acoustic event or the first video event.

13. A system comprising:

at least one processor; and non-transitory computer-readable memory storing instructions that, when executed by the at least one processor, are effective to:

receive a first natural language input from a first device;

generate first prompt data comprising the first natural language input;

generate, by a large language model (LLM) using the first prompt data, a first directive to send a first request to a first interface of a first computer-implemented system, wherein the first computer-implemented system is different from the first device;

receive first result data from the first computer-implemented system in response to the first request, wherein the first result data comprises a first time-stamped event associated with the first device or a second device;

generate second prompt data comprising the first natural language input and a representation of the first result data; and generate, by the LLM using the second prompt data, a first output action responsive to the first natural language input.

14. The system of claim 13, the non-transitory computer-readable memory storing further instructions that, when executed by the at least one processor, are further effective to:

determine first account identifier data associated with the first natural language input; and

US 12,597,421 B1

41 send the first account identifier data as a parameter in the first request, wherein the first device is registered in association with the first account identifier data.

15. The system of claim 13, the non-transitory computer-readable memory storing further instructions that, when executed by the at least one processor, are further effective to:

receive first data representing a series of time-stamped events from an event-driven architecture of the first computer-implemented system;

store the first data in a first data store associated with the LLM;

receive a second natural language input;

generate third prompt data comprising the second natural language input and the first data; and generate, by the LLM using the third prompt data, a second output action responsive to the second natural language input.

16. The system of claim 13, the non-transitory computer-readable memory storing further instructions that, when executed by the at least one processor, are further effective to:

receive second result data in response to the first request, the second result data comprising a time series of event data, wherein a first event of the time series of event data is generated by the first device and wherein a second event of the time series of event data is generated by the second device; and generate the second prompt data further comprising data representing the first event and the second event.

17. The system of claim 13, the non-transitory computer-readable memory storing further instructions that, when executed by the at least one processor, are further effective to:

receive, by the first computer-implemented system, a first registration request comprising first identifier data identifying a first event type and first schema data defining organization of event data of the first event type; and

42 store, by the first computer-implemented system, the first identifier data in association with the first schema data in memory.

18. The system of claim 17, the non-transitory computer-readable memory storing further instructions that, when executed by the at least one processor, are further effective to:

receive, by the first computer-implemented system, first data specifying an access type for the first event type, wherein the first data specifies an asynchronous messaging API;

receive, by the first computer-implemented system from a remote computing device, a first subscribe request for the first event type;

receive, by the first computer-implemented system, first published event data of the first event type; and send, by the first computer-implemented system to the remote computing device, the first published event data using the asynchronous messaging API.

19. The system of claim 13, the non-transitory computer-readable memory storing further instructions that, when executed by the at least one processor, are further effective to:

receive first event data by an asynchronous API of the first computer-implemented system;

determine, by the first computer-implemented system, first configuration data in header data of the first event data;

determine using the first configuration data in the header data that the first event data corresponds to a first event type; and store the first event data in a first data store that is associated with the first event type.

20. The system of claim 19, the non-transitory computer-readable memory storing further instructions that, when executed by the at least one processor, are further effective to generate a first composite event comprising a first value extracted from first event data and a second value extracted from second event data, wherein the first result data comprises the first composite event.

* * * * *